United States Patent [19]
Mihara

[11] Patent Number: 4,629,293
[45] Date of Patent: Dec. 16, 1986

[54] ZOOM LENS SYSTEM
[75] Inventor: Shin-ichi Mihara, Tokyo, Japan
[73] Assignee: Olympus Optical Co., Ltd., Tokyo, Japan
[21] Appl. No.: 707,869
[22] Filed: Mar. 4, 1985
[30] Foreign Application Priority Data
   Mar. 7, 1984 [JP] Japan .................. 59-41976
[51] Int. Cl.$^4$ .............................. G02B 15/14
[52] U.S. Cl. ................................. 350/427
[58] Field of Search ................. 350/423, 427
[56] References Cited
   U.S. PATENT DOCUMENTS
   4,518,228  5/1985  Sugiura ................. 350/427
   4,525,036  6/1985  Fujibayashi et al. ..... 350/427
   FOREIGN PATENT DOCUMENTS
   58-102208  6/1983  Japan .
   58-202419  11/1983  Japan .

*Primary Examiner*—John K. Corbin
*Assistant Examiner*—Rebecca D. Gass
*Attorney, Agent, or Firm*—Cushman, Darby & Cushman

[57] ABSTRACT

A high performance zoom lens system having a very large aperture ratio and a long back focal distance comprising a first lens group having a focusing function and positive power, a second lens group movable along the optical axis, and having a function mainly for varying focal length of said zoom lens system as a whole and negative power, a third lens group movable along the optical axis, and having a function mainly for correcting the image position and negative power, and a fourth relay lens group, said fourth lens group consisting of a front subgroup comprising three positive lens components and a negative lens component, and a rear subgroup comprising two positive lens components.

16 Claims, 28 Drawing Figures

ZOOM LENS SYSTEM

BACKGROUND OF THE INVENTION (a) Field of the Invention

The present invention relates to a zoom lens system having a large aperture ratio of F/1.2 to F/1.4 and a zooming ratio on the order of 8 for use with television cameras.

(b) Description of the Prior Art

Under the present circumstance, portable television cameras adopt mainly image pick-up tubes having a faceplate diameter of ⅔ inch, and photographing zoom lens systems for these cameras generally designed for F numbers of 1.4 to 2.0 and zooming ratios of 2 to 6. Along with the recent compact design of television cameras, however, there is a trend to manufacture image pick-up tubes having a size of ½ inch, and compactness is demanded also for photographing lens systems.

When faceplate diameter of image pick-up tubes is reduced from ⅔ inch to ½ inch, sensitivity of said image pick-up tubes is lowered, thereby making it necessary to increase aperture ratio of the lens systems for use with said image pick-up tubes by reducing F number of 1.2 to 1.4. Further, when magnification at the stage of image reproduction on CRT is taken into consideration, it is necessary to enhance resolution on the photographing surface. Therefore, it is not easy to design a more compact photographing lens system when faceplate diameter is reduced from ⅔ inch to ½ inch.

As a conventional example of a photographing lens systems compatible with the image pick-up tubes having the size of ½ inch, there has already been known the one disclosed by Japanese Published Unexamined Patent Application No. 102208/83. This zoom lens system has a total length of approximately 2.1 times of its focal length at the tele position, an F number of 1.2 even at the tele position, a varifocal ratio of 6, compact design and high performance. However, this zoom lens system has a defect that its back focal distance is too short to interpose shutter and other members between the lens system and image pick-up tube.

SUMMARY OF THE INVENTION

A general object of the present invention is to provide a high performance zoom lens system having very large aperture ratio of F/1.2 to F/1.4, a high zooming ratio of 6 and a back focal distance longer than 0.7 times of a geometrical means $f_S$ of the shortest focal length and the longest focal length of said zoom lens system.

In order to accomplish the above-mentioned object, the zoom lens system according to the present invention comprises a first lens group I having a focusing function and positive power, a second lens group II movable along the optical axis and having a function mainly for varying focal length of said zoom lens system as a whole and negative power, a third lens group movable along the optical axis for zooming and having a function mainly for maintaining the image position constant and negative power, and a fourth relay lens group kept fixed even for zooming. Said fourth lens group comprises a front sub-group IVa and a rear subgroup IVb. Said front subgroup IVa has a composition comprising three positive lens components and at least one negative lens component arranged from the object side, whereas said rear subgroup IVb has a composition comprising at least two positive lens components.

The zoom lens system according to the present invention is designed as a nearly telecentric optical system which is a requirement for a zoom lens system for television cameras having aperture ratio of F/1.2 to F/1.4, a zooming ratio of 8 and high performance. Further, in order to obtain a back focal distance longer than $0.7f_S$, the zoom lens system according to the present invention is designed in such a manner that rays are diverged in the varifocal subsystem ranging from said first lens group I to said third lens group III, and in order to converge the rays, at least three positive lens components are arranged on the object side in the front subgroup IVa of said fourth lens group and a negative lens component is arranged on the image side of said positive lens component for correcting aberrations and prolonging back focal distance of said zoom lens system as a whole. When a position closer to said positive lens components is selected for the negative lens component arranged on the image side in said front subgroup, it is advantageous to prolong back focal distance of said zoom lens system as a whole, but it is apt to increase total length of the zom lens system as a whole and, at the same time, it makes said front subgroup incapable of sufficiently converging the rays emerging from the third lens group, whereby heights of the rays are generally increased on the fourth lens groups, thereby making it necessary to enlarge diameter of said fourth lens group and being undesirable also for correcting aberrations. When a position shifted toward the image side is selected for said negative lens component, in contrast, it will be impossible to prolong back focal distance of the zoom lens system as a whole. If it is attempted to forcibly prolong back focal distance of the zoom lens system as a whole in this condition, the negative lens component will have strong power, whereby spherical aberration will have remarkable curvature in the zonal area and large positive value in the marginal area. The rear subgroup of said fourth lens group has a composition comprising two positive lens components for the purpose of designing the zoom lens system as a telecentric system and prolonging back focal distance of said lens system regardless of the short focal length of the fourth lens group IV. When said positive lens component is arranged on the extreme image side of the rear subgroup and has strong power, principal ray emerging from the zoom lens system is nearly parallel with the optical axis and, at the same time, the principal point of the fourth lens group IV is shifted rearward.

The zoom lens system according to the present invention is characterized not only by the lens composition described above but in that the system ranging from the first lens group I to the front subgroup IVa of the fourth lens group IV has a total focal length $f_A$ satisfying the following condition (1):

$$-0.15 < f_W/f_A < 0.5 \tag{1}$$

wherein the reference symbol $f_W$ represents the shortest focal length of said zoom lens system.

If $f_W/f_A$ has a value exceeding the upper limit of the condition (1), it will be impossible to prolong back focal distance of the zoom lens system as a whole or total length of the fourth lens group IV is apt to be prolonged. If $f_W/f_A$ has a value smaller than the lower limit of the condition (1), in contrast, it will be easy to obtain a back focal distance of the zoom lens system longer than 0.7f$_S$, but it will be difficult to correct spherical aberration and coma.

A zoom lens system comprising the fourth relay lens group having the above-described composition can accomplish the object of the present invention. Further, a zoom lens system having a short total length and more favorably corrected aberration can be obtained when the zoom lens system according to the present invention is designed in such a manner that said first lens group I comprises a positive doublet lens component consisting of a negative meniscus lens element having a convex surface on the object side and a positive lens element, and a positive single-element meniscus lens component, and the varifocal system ranging from said first lens group I to said third lens group III is so designed as to satisfy the following conditions (2) through (4):

$$5.8f_W < f_I < 7.8f_W \quad (2)$$

$$1.25f_W < -f_{II} < 1.85f_W \quad (3)$$

$$0.58f_I < r_4 < 0.79f_I \quad (4)$$

wherein the reference symbols $f_I$ and $f_{II}$ represent focal lengths of said first lens group I and said second lens group II respectively, and the reference symbol $r_4$ designates radius of curvature on the object side surface of the positive meniscus lens component arranged in said first lens group.

The condition (2) defines focal length $f_I$ of said first lens group I. If $f_I$ has a value exceeding the upper limit of the condition (2), total length of said zoom lens system as a whole will be prolonged. If $f_I$ has a value smaller than the lower limit of the condition (2), in contrast, it will be impossible to correct aberrations sufficiently for obtaining a bright zoom lens system having aperture ratio of F/1.2 to F/1.4, and rays will be eclipsed. Further, performance of the zoom lens system will be degraded when said zoom lens system is focused on an object located at a short distance.

The condition (3) defines focal length $f_{II}$ of said second lens group. If the upper limit of the condition (3) is exceeded, said second lens group will be shifted for a long distance for zooming and it will be obliged to prolong total length of said varifocal subsystem for reserving the space for shifting said second lens group II. If $f_{II}$ has a value smaller than the lower limit of the condition (3), in contrast, aberrations will be remarkably varied when said lens system is zoomed, thereby making it impossible to design said zoom lens system so as to have a zooming ratio of 8.

The condition (4) defines radius of curvature $r_4$ on the object side surface of the positive single-element meniscus lens component arranged in said first lens group I. When the zoom lens system is focused on an object located at a short distance by shifting said first lens group I frontward, spherical aberration is remarkably varied especially at the longest focal length. Especially in case of a bright lens system having aperture ratio of F/1.2 to F/1.4, image quality is remarkably degraded by the above-mentioned variation of spherical aberration.

In the zoom lens system according to the present invention, variation of spherical aberration is largely dependent on value of the above-mentioned radius of curvature $r_4$ and spherical aberration is remarkably varied when $r_4$ has a small value. Accordingly, if $r_4$ has a value smaller than the lower limit of the condition (4), spherical aberration will be remarkably undercorrected in a condition where the zoom lens system is focused on an object located at a short distance. If $r_4$ has a value larger than the upper limit of the condition (4), in contrast, this surface will have too small a curvature, thereby prolonging focal length $f_I$ and the total length of said zoom lens system as a whole. In order to prevent the value of $f_I$ from having a large value, the single-element lens component must have such a shape as to make the radius of curvatuve large on the image side surface thereof or a bicovex shape to make radius of curvature negative on said surface. However, the image side surface will give adverse influence on correction of aberrations and aggravate astigmatism especially at an infinite object point.

Furthermore, aberrations can be corrected more favorably and sufficient intensity of marginal ray can be obtained in the zoom lens system having aperture ratio of F/1.2 to F/1.4 and zooming ratio of 8 (field angle of 7° to 53°) by selecting for said second lens group a composition comprising a negative single-element lens component and a negative lens component consisting of a biconcave lens element and a positive lens element, and for said third lens group III a composition comprising a negative single-element lens component or a negative lens component consisting of a negative lens element and a positive lens element.

Moreover, the zoom lens system according to the present invention should desirably satisfy the following conditions (5) and (6) for more favorable correction of aberrations:

$$1.78 < n_{IVan} \quad (5)$$

$$\nu_{IVap} < \nu_{IVbp} \quad (6)$$

wherein the reference symbol $n_{IVan}$ represents refractive index of the negative lens component arranged in the front subgroup of said fourth lens group, the reference symbol $\nu_{IVap}$ designates a mean Abbe's number of the positive lens components arranged in the front subgroup IVa of said fourth lens group and the reference symbol $\nu_{IVbp}$ denotes a mean Abbe's number of the positive lens components arranged in the rear subgroup of said fourth lens group.

If the condition (5) is not satisfied, the object side surface of the negative lens component will have a small radius of curvatuve, allowing higher order spherical aberration to be easily produced.

The condition (6) has been adopted to correct lateral chromatic aberration. If the condition (6) is not satisfied, lateral chromatic aberration will be undercorrected though longitudinal chromatic aberration can be corrected.

DETAILED DESCRIPTION OF THE PREFERRED EMBODIMENTS

Figure 1:
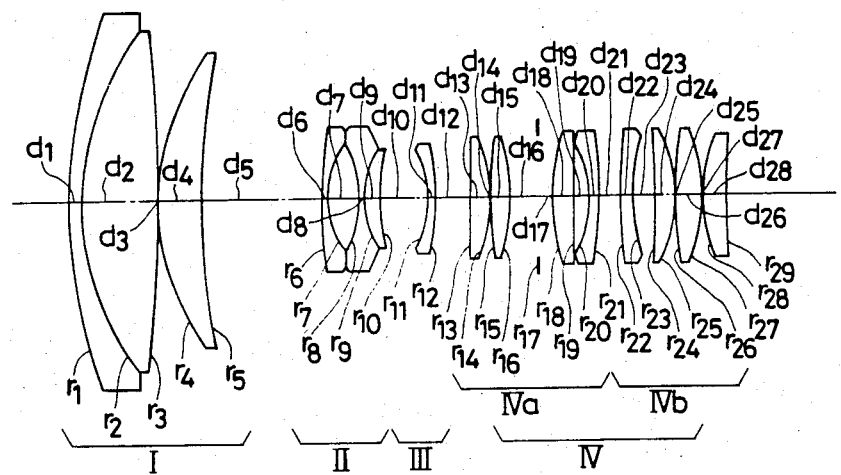
FIG. 1 through FIG. 7 show sectional views illustrating compositions of Embodiments 1 through 7 of the zoom lens system according to the present invention.

Now, numerical data will be described as preferred embodiments of the present invention detailedly described above.

EMBODIMENT 1

$f = 8 \sim 22.63 \sim 64$ $r_1 = 85.4735$
$d_1 = 1.8700$    $n_1 = 1.80518$    $\nu_1 = 25.43$
$r_2 = 43.6810$
$d_2 = 12.7000$   $n_2 = 1.62041$    $\nu_2 = 60.27$
$r_3 = -277.9006$
$d_3 = 0.1500$
$r_4 = 39.2589$
$d_4 = 7.2200$    $n_3 = 1.62041$    $\nu_3 = 60.27$
$r_5 = 120.0813$
$d_5 = 2.3617 \sim 19.733 \sim 29.339$
$r_6 = 95.3684$
$d_6 = 0.7000$    $n_4 = 1.72916$    $\nu_4 = 54.68$
$r_7 = 14.9068$
$d_7 = 5.5000$
$r_8 = -21.3833$
$d_8 = 0.7000$    $n_5 = 1.69680$    $\nu = 55.52$
$r_9 = 14.2396$
$d_9 = 2.7000$    $n_6 = 1.84666$    $\nu_6 = 23.88$
$r_{10} = 47.8333$
$d_{10} = 29.7663 \sim 8.055 \sim 2.789$
$r_{11} = -16.6399$
$d_{11} = 1.2000$  $n_7 = 1.69680$   $\nu_7 = 55.52$
$r_{12} = -41.6382$
$d_{12} = 1.3468 \sim 5.687 \sim 1.347$
$r_{13} = -335.6182$
$d_{13} = 3.2000$  $n_8 = 1.51454$   $\nu_8 = 54.69$
$r_{14} = -23.9469$
$d_{14} = 0.1000$
$r_{15} = 67.8923$
$d_{15} = 3.2000$  $n_9 = 1.51454$   $\nu_9 = 54.69$
$r_{16} = -38.1862$
$d_{16} = 5.0000$
$r_{17} = \infty$ (stop)
$d_{17} = 2.0000$
$r_{18} = 33.5096$
$d_{18} = 3.7618$  $n_{10} = 1.56873$  $\nu_{10} = 63.16$
$r_{19} = -204.0980$
$d_{19} = 2.4500$
$r_{20} = -20.1993$
$d_{20} = 1.4443$  $n_{11} = 1.80518$  $\nu_{11} = 25.43$
$r_{21} = -66.5246$
$d_{21} = 3.5000$
$r_{22} = 112.4502$
$d_{22} = 2.0593$  $n_{12} = 1.84666$  $\nu_{12} = 23.88$
$r_{23} = 36.7424$
$d_{23} = 3.8000$
$r_{24} = -165.7742$
$d_{24} = 3.1200$  $n_{13} = 1.48749$  $\nu_{13} = 70.15$
$r_{25} = -26.2172$
$d_{25} = 0.1000$
$r_{26} = 73.7974$
$d_{26} = 4.1400$  $n_{14} = 1.48749$  $\nu_{14} = 70.15$
$r_{27} = -29.3976$
$d_{27} = 0.1500$
$r_{28} = 23.2052$
$d_{28} = 4.0000$  $n_{15} = 1.48749$  $\nu_{15} = 70.15$
$r_{29} = 332.8647$ $f_W/f_A = -0.02317$, $f_1/f_W = 6.964$
$-f_2/f_W = 1.363$, $r_4/f_1 = 0.7047$
$n_{IVan} = 1.80518$, $\nu_{IVap} - \nu_{IVbp} = -12.64$
$f_B = 0.88 f_S$

EMBODIMENT 2

$f = 8 \sim 22.63 \sim 64$ $r_1 = 68.1165$
$d_1 = 1.8700$    $n_1 = 1.78472$    $\nu_1 = 25.71$
$r_2 = 38.5219$
$d_2 = 13.5000$   $n_2 = 1.62041$    $\nu_2 = 60.27$
$r_3 = 25151.3683$
$d_3 = 0.1500$
$r_4 = 42.6858$
$d_4 = 7.5000$    $n_3 = 1.62041$    $\nu_3 = 60.27$
$r_5 = 142.3524$
$d_5 = 1.3793 \sim 19.410 \sim 29.351$
$r_6 = 336.5803$
$d_6 = 1.0000$    $n_4 = 1.72916$    $\nu_4 = 54.68$
$r_7 = 16.3280$
$d_7 = 5.5000$
$r_8 = -177.3882$
$d_8 = 3.4000$    $n_5 = 1.80518$    $\nu_5 = 25.43$
$r_9 = -20.6994$
$d_9 = 1.0000$    $n_6 = 1.72916$    $\nu_6 = 54.68$
$r_{10} = 32.4097$
$d_{10} = 27.2186 \sim 7.158 \sim 3.850$
$r_{11} = -15.0752$
$d_{11} = 1.0000$  $n_7 = 1.58913$    $\nu_7 = 60.97$
$r_{12} = 57.9535$
$d_{12} = 2.0000$  $n_8 = 1.80518$    $\nu_8 = 25.43$
$r_{13} = -156.4333$
$d_{13} = 6.1288 \sim 8.159 \sim 1.526$
$r_{14} = -140.9467$
$d_{14} = 3.2000$  $n_9 = 1.51112$    $\nu_9 = 60.48$
$r_{15} = -23.2467$
$d_{15} = 0.1000$
$r_{16} = 71.2551$
$d_{16} = 3.2000$  $n_{10} = 1.56873$  $\nu_{10} = 63.16$
$r_{17} = -54.0741$
$d_{17} = 5.0000$
$r_{18} = \infty$ (stop)
$d_{18} = 2.0000$
$r_{19} = 37.4988$
$d_{19} = 3.7618$  $n_{11} = 1.48749$  $\nu_{11} = 70.15$
$r_{20} = -115.2936$
$d_{20} = 2.4500$
$r_{21} = -22.4039$
$d_{21} = 1.4443$  $n_{12} = 1.84666$  $\nu_{12} = 23.88$
$r_{22} = -62.0749$
$d_{22} = 3.5000$
$r_{23} = 1.54.4449$
$d_{23} = 2.0593$  $n_{13} = 1.80518$  $\nu_{13} = 25.43$
$r_{24} = 32.4881$
$d_{24} = 3.8000$
$r_{25} = 479.9838$
$d_{25} = 3.1200$  $n_{14} = 1.48749$  $\nu_{14} = 70.15$
$r_{26} = -31.9806$
$d_{26} = 0.1000$
$r_{27} = 45.2918$
$d_{27} = 4.6400$  $n_{15} = 1.48749$  $\nu_{15} = 70.15$
$r_{28} = -28.3955$
$d_{28} = 0.1500$
$r_{29} = 21.7612$
$d_{29} = 3.5000$  $n_{16} = 1.48749$  $\nu_{16} = 70.15$
$r_{30} = 75.8496$ $f_W/f_A = 0.01013$, $f_1/f_W = 7.299$
$-f_2/f_W = 1.701$, $r_4/f_1 = 0.7310$
$n_{IVan} = 1.84666$, $\nu_{IVap} - \nu_{IVbp} = -8.33$
$f_B = 0.88 f_S$

EMBODIMENT 3

$f = 8 \sim 22.63 \sim 64$ $r_1 = 83.4999$
$d_1 = 1.8700$    $n_1 = 1.78472$    $\nu_1 = 25.71$
$r_2 = 39.5121$
$d_2 = 13.8000$   $n_2 = 1.62299$    $\nu_2 = 58.14$
$r_3 = -393.4583$
$d_3 = 0.1500$
$r_4 = 38.6529$
$d_4 = 8.2000$    $n_3 = 1.62041$    $\nu_3 = 60.27$ -continued

| $f = 8 \sim 22.63 \sim 64$ | | |
|---|---|---|
| $r_5 = 151.0703$ | | |
| $d_5 = 1.0304 \sim 18.366 \sim 27.789$ | | |
| $r_6 = 204.0839$ | | |
| $d_6 = 0.9000$ | $n_4 = 1.73400$ | $\nu_4 = 51.49$ |
| $r_7 = 12.9841$ | | |
| $d_7 = 5.0000$ | | |
| $r_8 = -22.3059$ | | |
| $d_8 = 1.0000$ | $n_5 = 1.72000$ | $\nu_5 = 50.25$ |
| $r_9 = 13.0696$ | | |
| $d_9 = 4.1000$ | $n_6 = 1.80518$ | $\nu_6 = 25.43$ |
| $r_{10} = -167.8960$ | | |
| $d_{10} = 26.7210 \sim 7.724 \sim 3.300$ | | |
| $r_{11} = -18.6243$ | | |
| $d_{11} = 1.0000$ | $n_7 = 1.69680$ | $\nu_7 = 55.52$ |
| $r_{12} = -188.2149$ | | |
| $d_{12} = 3.8445 \sim 5.504 \sim 0.518$ | | |
| $r_{13} = -65.9779$ | | |
| $d_{13} = 3.4952$ | $n_8 = 1.51112$ | $\nu_8 = 60.48$ |
| $r_{14} = -20.4085$ | | |
| $d_{14} = 0.1500$ | | |
| $r_{15} = 79.0399$ | | |
| $d_{15} = 3.5000$ | $n_9 = 1.51742$ | $\nu_9 = 52.41$ |
| $r_{16} = -39.7602$ | | |
| $d_{16} = 5.0000$ | | |
| $r_{17} = \infty$ (stop) | | |
| $d_{17} = 1.4000$ | | |
| $r_{18} = 39.8039$ | | |
| $d_{18} = 3.4000$ | $n_{10} = 1.51633$ | $\nu_{10} = 64.15$ |
| $r_{19} = -87.3157$ | | |
| $d_{19} = 2.2500$ | | |
| $r_{20} = -21.4971$ | | |
| $d_{20} = 1.3542$ | $n_{11} = 1.80518$ | $\nu_{11} = 25.43$ |
| $r_{21} = -43.0238$ | | |
| $d_{21} = 7.4556$ | | |
| $r_{22} = 50.3713$ | | |
| $d_{22} = 4.5196$ | $n_{12} = 1.78590$ | $\nu_{12} = 44.18$ |
| $r_{23} = -140.0701$ | | |
| $d_{23} = 1.3104$ | $n_{13} = 1.78472$ | $\nu_{13} = 25.71$ |
| $r_{24} = 27.3364$ | | |
| $d_{24} = 2.8253$ | | |
| $r_{25} = -2773.1584$ | | |
| $d_{25} = 3.0001$ | $n_{14} = 1.51633$ | $\nu_{14} = 64.15$ |
| $r_{26} = -34.8803$ | | |
| $d_{26} = 0.1513$ | | |
| $r_{27} = 92.5212$ | | |
| $d_{27} = 4.5030$ | $n_{15} = 1.51633$ | $\nu_{15} = 64.15$ |
| $r_{28} = -26.0676$ | | |
| $d_{28} = 0.1543$ | | |
| $r_{29} = 21.9704$ | | |
| $d_{29} = 2.9769$ | $n_{16} = 1.51454$ | $\nu_{16} = 54.69$ |
| $r_{30} = 50.7233$ | | |
| $f_W/f_A = 0.01226$, $f_1/f_W = 6.731$ | | |
| $-f_2/f_W = 1.608$, $r_4/f_1 = 0.7177$ | | |
| $n_{IVan} = 1.80518$, $\nu_{IVap} - \nu_{IVbp} = -0.4067$ | | |
| $f_B = 0.88 f_S$ | | |

EMBODIMENT 4

| $f = 8 \sim 22.63 \sim 64$ | | |
|---|---|---|
| $r_1 = 85.2998$ | | |
| $d_1 = 1.8700$ | $n_1 = 1.78472$ | $\nu_1 = 25.71$ |
| $r_2 = 38.1383$ | | |
| $d_2 = 13.8000$ | $n_2 = 1.62299$ | $\nu_2 = 58.14$ |
| $r_3 = -380.4945$ | | |
| $d_3 = 0.1500$ | | |
| $r_4 = 39.2209$ | | |
| $d_4 = 8.2000$ | $n_3 = 1.65830$ | $\nu_3 = 57.33$ |
| $r_5 = 168.6431$ | | |
| $d_5 = 1.0010 \sim 17.792 \sim 26.914$ | | |
| $r_6 = 195.2821$ | | |
| $d_6 = 0.9000$ | $n_4 = 1.77250$ | $\nu_4 = 49.66$ |
| $r_7 = 13.5082$ | | |
| $d_7 = 5.0000$ | | |
| $r_8 = -22.5191$ | | |
| $d_8 = 1.0000$ | $n_5 = 1.72000$ | $\nu_5 = 50.25$ |
| $r_9 = 13.8588$ | | |
| $d_9 = 3.8000$ | $n_6 = 1.80518$ | $\nu_6 = 25.43$ |

-continued

| $f = 8 \sim 22.63 \sim 64$ | | |
|---|---|---|
| $r_{10} = \infty$ | | |
| $d_{10} = 26.7092 \sim 7.483 \sim 3.214$ | | |
| $r_{11} = -22.1011$ | | |
| $d_{11} = 1.0000$ | $n_7 = 1.69680$ | $\nu_7 = 55.52$ |
| $r_{12} = -505.3584$ | | |
| $d_{12} = 4.1308 \sim 6.565 \sim 1.716$ | | |
| $r_{13} = -83.2775$ | | |
| $d_{13} = 3.1000$ | $n_8 = 1.51742$ | $\nu_8 = 52.41$ |
| $r_{14} = -21.8645$ | | |
| $d_{14} = 0.1500$ | | |
| $r_{15} = 78.1851$ | | |
| $d_{15} = 3.4000$ | $n_9 = 1.51742$ | $\nu_9 = 52.41$ |
| $r_{16} = -45.6704$ | | |
| $d_{16} = 5.0000$ | | |
| $r_{17} = \infty$ (stop) | | |
| $d_{17} = 1.6000$ | | |
| $r_{18} = 36.8992$ | | |
| $d_{18} = 3.4000$ | $n_{10} = 1.56883$ | $\nu_{10} = 56.34$ |
| $r_{19} = -130.9824$ | | |
| $d_{19} = 2.3000$ | | |
| $r_{20} = -23.0307$ | | |
| $d_{20} = 1.2000$ | $n_{11} = 1.80610$ | $\nu_{11} = 40.95$ |
| $r_{21} = -48.7407$ | | |
| $d_{21} = 7.7297$ | | |
| $r_{22} = 40.0123$ | | |
| $d_{22} = 4.2488$ | $n_{12} = 1.62041$ | $\nu_{12} = 60.27$ |
| $r_{23} = -44.8822$ | | |
| $d_{23} = 0.9950$ | | |
| $r_{24} = -59.3863$ | | |
| $d_{24} = 2.0835$ | $n_{13} = 1.80518$ | $\nu_{13} = 25.43$ |
| $r_{25} = 25.8830$ | | |
| $d_{25} = 2.4035$ | | |
| $r_{26} = \infty$ | | |
| $d_{26} = 2.8021$ | $n_{14} = 1.51633$ | $\nu_{14} = 64.15$ |
| $r_{27} = -37.2847$ | | |
| $d_{27} = 0.1513$ | | |
| $r_{28} = 138.5316$ | | |
| $d_{28} = 3.9500$ | $n_{15} = 1.62041$ | $\nu_{15} = 60.27$ |
| $r_{29} = -27.8790$ | | |
| $d_{29} = 0.1543$ | | |
| $r_{30} = 22.8642$ | | |
| $d_{30} = 2.7749$ | $n_{16} = 1.51633$ | $\nu_{16} = 64.15$ |
| $r_{31} = 59.6479$ | | |
| $f_W/f_A = 0.04802$, $f_1/f_W = 6.516$ | | |
| $-f_2/f_W = 1.463$, $r_4/f_1 = 0.7523$ | | |
| $n_{IVan} = 1.80610$, $\nu_{IVap} - \nu_{IVbp} = -8.49$ | | |
| $f_B = 0.88 f_S$ | | |

EMBODIMENT 5

| $f = 8 \sim 22.63 \sim 64$ | | |
|---|---|---|
| $r_1 = 82.6128$ | | |
| $d_1 = 1.8700$ | $n_1 = 1.80518$ | $\nu_1 = 25.43$ |
| $r_2 = 43.6256$ | | |
| $d_2 = 12.7000$ | $n_2 = 1.61700$ | $\nu_2 = 62.79$ |
| $r_3 = -330.9077$ | | |
| $d_3 = 0.1500$ | | |
| $r_4 = 37.4317$ | | |
| $d_4 = 7.1000$ | $n_3 = 1.61700$ | $\nu_3 = 62.79$ |
| $r_5 = 103.1788$ | | |
| $d_5 = 2.7425 \sim 20.171 \sim 29.717$ | | |
| $r_6 = 97.9540$ | | |
| $d_6 = 0.7000$ | $n_4 = 1.65160$ | $\nu_4 = 58.67$ |
| $r_7 = 12.8674$ | | |
| $d_7 = 5.5000$ | | |
| $r_8 = -22.9442$ | | |
| $d_8 = 0.7000$ | $n_5 = 1.62041$ | $\nu_5 = 60.27$ |
| $r_9 = 14.4737$ | | |
| $d_9 = 2.7000$ | $n_6 = 1.78472$ | $\nu_6 = 25.71$ |
| $r_{10} = 37.1680$ | | |
| $d_{10} = 30.7735 \sim 9.034 \sim 3.799$ | | |
| $r_{11} = -14.3232$ | | |
| $d_{11} = 1.2000$ | $n_7 = 1.69680$ | $\nu_7 = 55.52$ |
| $r_{12} = -29.5067$ | | |
| $d_{12} = 1.3562 \sim 5.667 \sim 1.357$ | | |
| $r_{13} = -91.9797$ | | |
| $d_{13} = 3.2000$ | $n_8 = 1.54814$ | $\nu_8 = 45.78$ |

-continued f = 8~22.63~64

| | | |
|---|---|---|
| $r_{14} = -21.7629$ | | |
| $d_{14} = 0.1000$ | | |
| $r_{15} = 60.5159$ | | |
| $d_{15} = 3.2000$ | $n_9 = 1.54814$ | $\nu_9 = 45.78$ |
| $r_{16} = -49.6982$ | | |
| $d_{16} = 5.0000$ | | |
| $r_{17} = \infty$ (stop) | | |
| $d_{17} = 2.0000$ | | |
| $r_{18} = 59.0473$ | | |
| $d_{18} = 3.4000$ | $n_{10} = 1.51112$ | $\nu_{10} = 60.48$ |
| $r_{19} = -128.2891$ | | |
| $d_{19} = 2.3000$ | | |
| $r_{20} = -20.0949$ | | |
| $d_{20} = 2.0000$ | $n_{11} = 1.80518$ | $\nu_{11} = 25.43$ |
| $r_{21} = -47.3582$ | | |
| $d_{21} = 0.1000$ | | |
| $r_{22} = 64.5174$ | | |
| $d_{22} = 3.0000$ | $n_{12} = 1.51633$ | $\nu_{12} = 64.15$ |
| $r_{23} = -43.1117$ | | |
| $d_{23} = 2.6900$ | | |
| $r_{24} = 49.3303$ | | |
| $d_{24} = 2.3300$ | $n_{13} = 1.80518$ | $\nu_{13} = 25.43$ |
| $r_{25} = 17.6141$ | | |
| $d_{25} = 4.0000$ | | |
| $r_{26} = 79.8356$ | | |
| $d_{26} = 4.7000$ | $n_{14} = 1.48749$ | $\nu_{14} = 70.15$ |
| $r_{27} = -32.9791$ | | |
| $d_{27} = 0.1000$ | | |
| $r_{28} = 21.3622$ | | |
| $d_{28} = 5.1000$ | $n_{15} = 1.48749$ | $\nu_{15} = 70.15$ |
| $r_{29} = -34.3817$ | | |

$f_W/f_A = -0.11727$, $f_1/f_W = 7.032$
$-f_2/f_W = 1.362$, $r_4/f_1 = 0.6654$
$n_{IVan} = 1.80518$, $\nu_{IVap} - \nu_{IVbp} = -19.47$
$f_B = 0.88 f_S$

EMBODIMENT 6 f = 8~22.63~64

| | | |
|---|---|---|
| $r_1 = 129.6607$ | | |
| $d_1 = 1.8700$ | $n_1 = 1.80518$ | $\nu_1 = 25.43$ |
| $r_2 = 44.1287$ | | |
| $d_2 = 13.0000$ | $n_2 = 1.65160$ | $\nu_2 = 58.67$ |
| $r_3 = -149.8822$ | | |
| $d_3 = 0.1500$ | | |
| $r_4 = 34.6072$ | | |
| $d_4 = 7.3000$ | $n_3 = 1.63930$ | $\nu_3 = 44.88$ |
| $r_5 = 80.9068$ | | |
| $d_5 = 2.3623 \sim 19.731 \sim 29.340$ | | |
| $r_6 = 58.3741$ | | |
| $d_6 = 0.7000$ | $n_4 = 1.72916$ | $\nu_4 = 54.68$ |
| $r_7 = 14.3017$ | | |
| $d_7 = 5.5000$ | | |
| $r_8 = -18.8888$ | | |
| $d_8 = 0.7000$ | $n_5 = 1.69680$ | $\nu_5 = 55.52$ |
| $r_9 = 14.9872$ | | |
| $d_9 = 2.7000$ | $n_6 = 1.84666$ | $\nu_6 = 23.88$ |
| $r_{10} = 53.0165$ | | |
| $d_{10} = 29.7660 \sim 8.056 \sim 2.788$ | | |
| $r_{11} = -18.2358$ | | |
| $d_{11} = 1.2000$ | $n_7 = 1.69680$ | $\nu_7 = 55.52$ |
| $r_{12} = -52.8345$ | | |
| $d_{12} = 1.3466 \sim 5.688 \sim 1.346$ | | |
| $r_{13} = -74.8377$ | | |
| $d_{13} = 3.2000$ | $n_8 = 1.54072$ | $\nu_8 = 47.20$ |
| $r_{14} = -22.4834$ | | |
| $d_{14} = 0.1000$ | | |
| $r_{15} = 152.9197$ | | |
| $d_{15} = 3.2000$ | $n_9 = 1.54072$ | $\nu_9 = 47.20$ |
| $r_{16} = -39.3445$ | | |
| $d_{16} = 5.0000$ | | |
| $r_{17} = \infty$ (stop) | | |
| $d_{17} = 2.0000$ | | |
| $r_{18} = 39.6520$ | | |
| $d_{18} = 4.3000$ | $n_{10} = 1.62230$ | $\nu_{10} = 53.20$ |
| $r_{19} = -57.7570$ | | |
| $d_{19} = 1.1500$ | | |

-continued f = 8~22.63~64

| | | |
|---|---|---|
| $r_{20} = -29.3160$ | | |
| $d_{20} = 1.0000$ | $n_{11} = 1.80518$ | $\nu_{11} = 25.43$ |
| $r_{21} = -45.9397$ | | |
| $d_{21} = 0.1000$ | | |
| $r_{22} = 24.0615$ | | |
| $d_{22} = 2.8000$ | $n_{12} = 1.51633$ | $\nu_{12} = 64.15$ |
| $r_{23} = 77.5326$ | | |
| $d_{23} = 3.0300$ | | |
| $r_{24} = -27.9904$ | | |
| $d_{24} = 1.8100$ | $n_{13} = 1.80518$ | $\nu_{13} = 25.43$ |
| $r_{25} = 28.3194$ | | |
| $d_{25} = 4.3000$ | | |
| $r_{26} = -93.6370$ | | |
| $d_{26} = 2.8400$ | $n_{14} = 1.51633$ | $\nu_{14} = 64.15$ |
| $r_{27} = -24.5049$ | | |
| $d_{27} = 0.1000$ | | |
| $r_{28} = -2112.8362$ | | |
| $d_{28} = 4.3000$ | $n_{15} = 1.51633$ | $\nu_{15} = 64.15$ |
| $r_{29} = -19.4015$ | | |
| $d_{29} = 0.1000$ | | |
| $r_{30} = 21.4312$ | | |
| $d_{30} = 3.1000$ | $n_{16} = 1.51633$ | $\nu_{16} = 64.15$ |
| $r_{31} = 122.3414$ | | |

$f_W/f_A = 0.37481$, $f_1/f_W = 6.900$
$-f_2/f_W = 1.363$, $r_4/f_1 = 0.6270$
$n_{IVan} = 1.80518$, $\nu_{IVap} - \nu_{IVbp} = -14.95$
$f_B = 0.88 f_S$

EMBODIMENT 7 f = 8~22.63~64

| | | |
|---|---|---|
| $r_1 = 84.5007$ | | |
| $d_1 = 1.8700$ | $n_1 = 1.78472$ | $\nu_1 = 25.71$ |
| $r_2 = 38.6265$ | | |
| $d_2 = 13.8000$ | $n_2 = 1.62299$ | $\nu_2 = 58.14$ |
| $r_3 = -359.3933$ | | |
| $d_3 = 0.1500$ | | |
| $r_4 = 37.8232$ | | |
| $d_4 = 8.2000$ | $n_3 = 1.62041$ | $\nu_3 = 60.27$ |
| $r_5 = 153.8556$ | | |
| $d_5 = 1.0004 \sim 18.066 \sim 27.310$ | | |
| $r_6 = 297.3091$ | | |
| $d_6 = 0.9000$ | $n_4 = 1.77250$ | $\nu_4 = 49.66$ |
| $r_7 = 13.1817$ | | |
| $d_7 = 5.0000$ | | |
| $r_8 = -24.5364$ | | |
| $d_8 = 1.0000$ | $n_5 = 1.72916$ | $\nu_5 = 54.68$ |
| $r_9 = 12.5119$ | | |
| $d_9 = 4.1000$ | $n_6 = 1.80518$ | $\nu_6 = 25.43$ |
| $r_{10} = -382.8361$ | | |
| $d_{10} = 26.9879 \sim 7.779 \sim 3.319$ | | |
| $r_{11} = -17.4706$ | | |
| $d_{11} = 1.0000$ | $n_7 = 1.69680$ | $\nu_7 = 55.52$ |
| $r_{12} = -83.2942$ | | |
| $d_{12} = 4.3530 \sim 6.499 \sim 1.716$ | | |
| $r_{13} = -58.7565$ | | |
| $d_{13} = 3.5000$ | $n_8 = 1.62230$ | $\nu_8 = 53.20$ |
| $r_{14} = -23.1305$ | | |
| $d_{14} = 0.1500$ | | |
| $r_{15} = 83.8158$ | | |
| $d_{15} = 3.5000$ | $n_9 = 1.51742$ | $\nu_9 = 52.41$ |
| $r_{16} = -49.0445$ | | |
| $d_{16} = 5.0000$ | | |
| $r_{17} = \infty$ (stop) | | |
| $d_{17} = 1.4000$ | | |
| $r_{18} = 82.7336$ | | |
| $d_{18} = 3.6000$ | $n_{10} = 1.51633$ | $\nu_{10} = 64.15$ |
| $r_{19} = -63.1310$ | | |
| $d_{19} = 0.1500$ | | |
| $r_{20} = 40.0872$ | | |
| $d_{20} = 3.3989$ | $n_{11} = 1.51633$ | $\nu_{11} = 64.15$ |
| $r_{21} = -252.9334$ | | |
| $d_{21} = 2.2493$ | | |
| $r_{22} = -26.3481$ | | |
| $d_{22} = 1.1206$ | $n_{12} = 1.84666$ | $\nu_{12} = 23.88$ |
| $r_{23} = -134.8965$ | | |
| $d_{23} = 8.6193$ | | |

-continued $f = 8 \sim 22.63 \sim 64$

| | | |
|---|---|---|
| $r_{24} = 49.2015$ | | |
| $d_{24} = 1.6583$ | $n_{13} = 1.84666$ | $\nu_{13} = 23.88$ |
| $r_{25} = 26.8478$ | | |
| $d_{25} = 2.5010$ | | |
| $r_{26} = -322.1967$ | | |
| $d_{26} = 2.4268$ | $n_{14} = 1.48749$ | $\nu_{14} = 70.15$ |
| $r_{27} = -42.3196$ | | |
| $d_{27} = 0.1513$ | | |
| $r_{28} = 102.1009$ | | |
| $d_{28} = 4.2325$ | $n_{15} = 1.51633$ | $\nu_{15} = 64.15$ |
| $r_{29} = -23.0642$ | | |
| $d_{29} = 0.1543$ | | |
| $r_{30} = 22.8337$ | | |
| $d_{30} = 2.9968$ | $n_{16} = 1.48749$ | $\nu_{16} = 70.15$ |
| $r_{31} = 73.1952$ | | |

$f_W/f_A = 0.11953, \; f_1/f_W = 6.604$
$-f_2/f_W = 1.514, \; r_4/f_1 = 0.7161$
$n_{IVan} = 1.84666, \; \nu_{IVap} - \nu_{IVbp} = -10.563$
$f_b = 0.88 f_S$ wherein the reference symbols $r_1, r_2, \ldots$ represent radii of curvature on the surfaces of the respective lens elements, the reference symbols $d_1, d_2, \ldots$ designate thicknesses of the respective lens element and airspaces reserved therebetween, the reference symbols $n_1, n_2, \ldots$ denote refractive indices of the respective lens elements, the reference symbols $\nu_1, \nu_2, \ldots$ represent Abbe's numbers of the respective lens elements, the reference symbol f designates focal length of the zoom lens system as a whole and the reference symbol $f_B$ denotes back focal distance of the zoom lens system as a whole.

Figure 8:
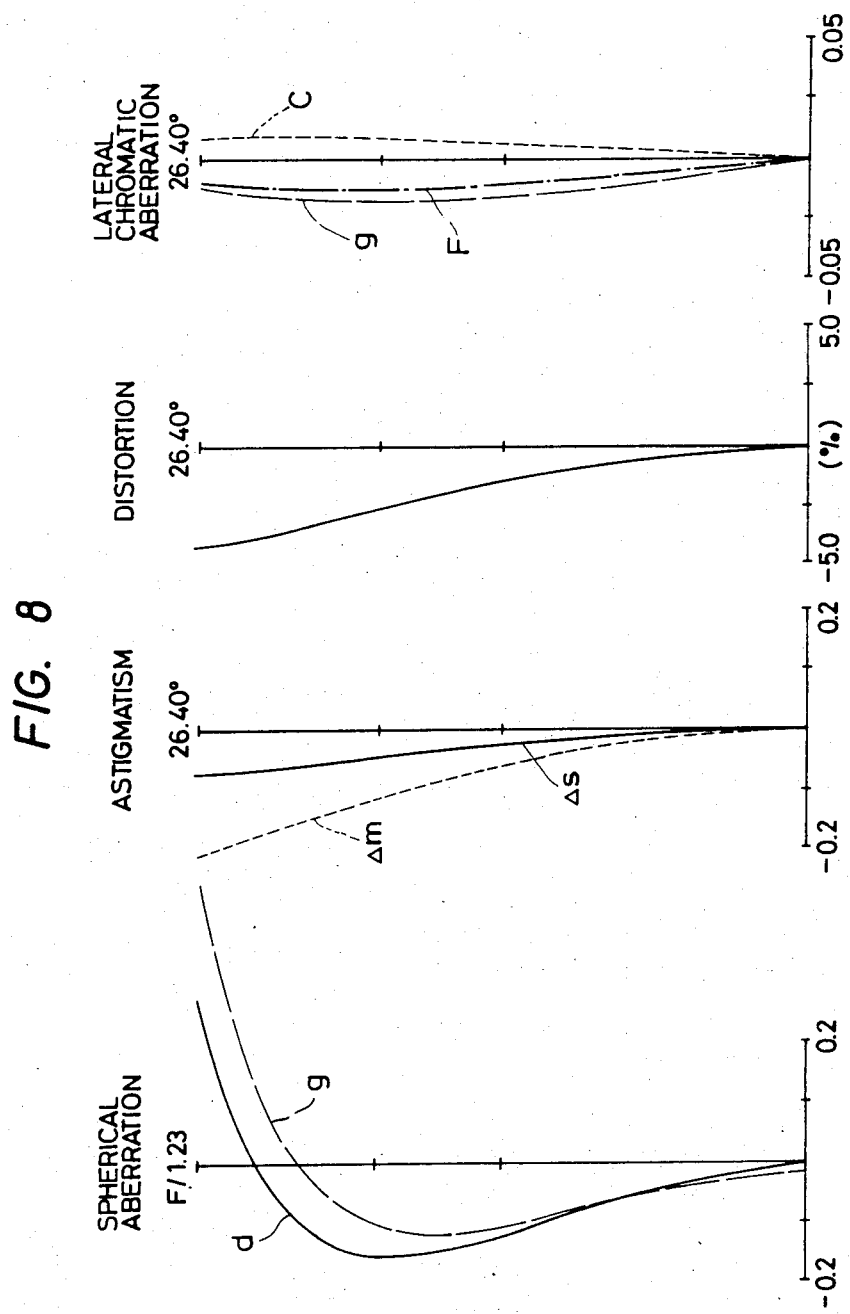
FIG. 8 through FIG. 10 show curves illustrating aberration characteristics of the Embodiment 1.
Figure 9:
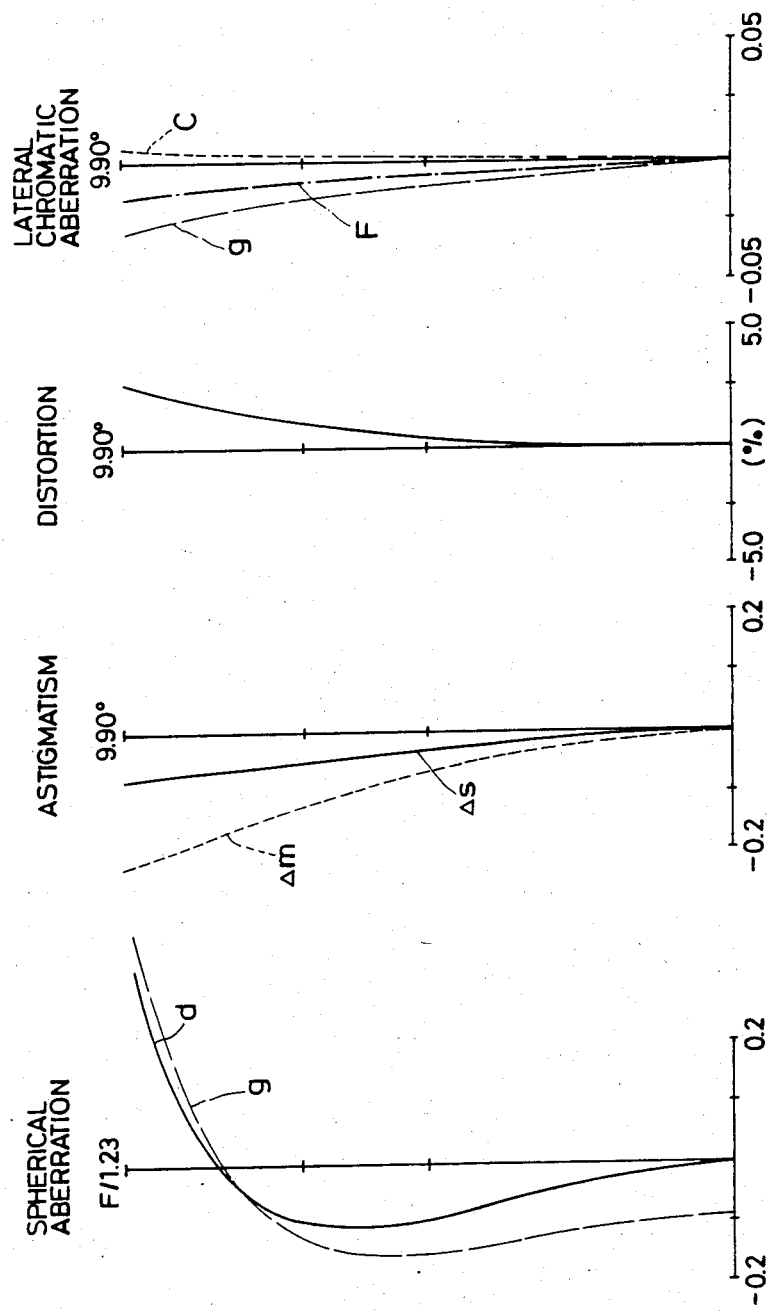
Figure 10:
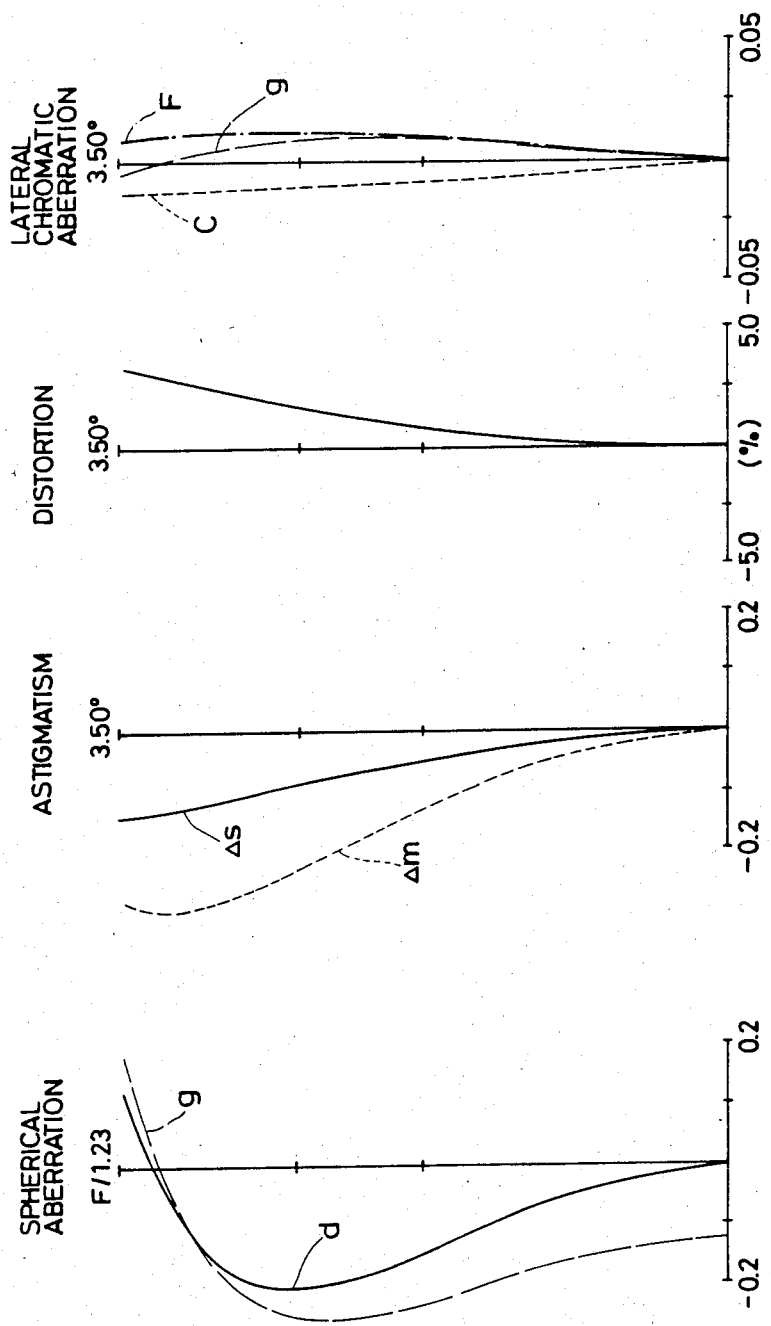

The Embodiment 1 has the composition shown in FIG. 1. That is to say, the fourth lens group comprises the front subgroup IVa consisting of three positive lens components and a negative lens component, and the rear subgroup IVb consisting of a negative lens component and three positive lens components. Aberration characteristics of this Embodiment at the wide, standard and tele positions thereof are illustrated in FIG. 8, FIG. 9 and FIG. 10 respectively.

Figure 2:
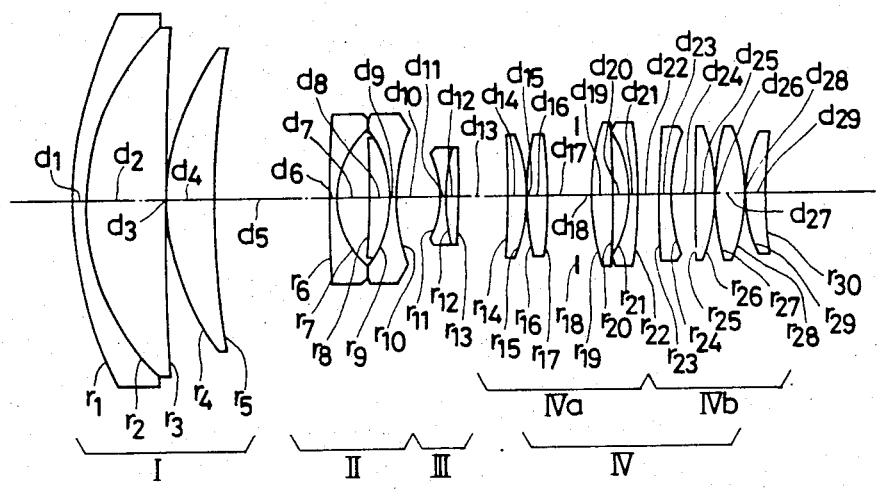
Figure 11:
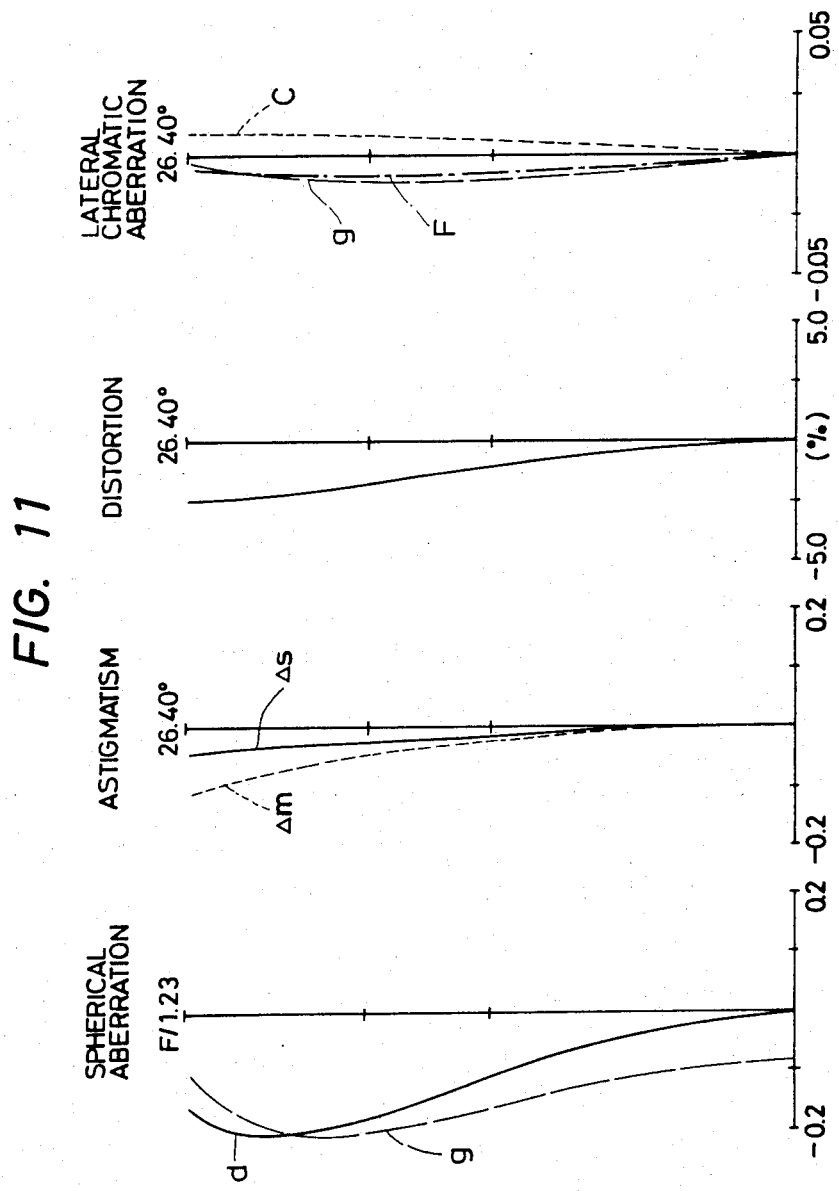
FIG. 11 through FIG. 13 show curves illustrating aberration characteristics of the Embodiment 2.
Figure 12:
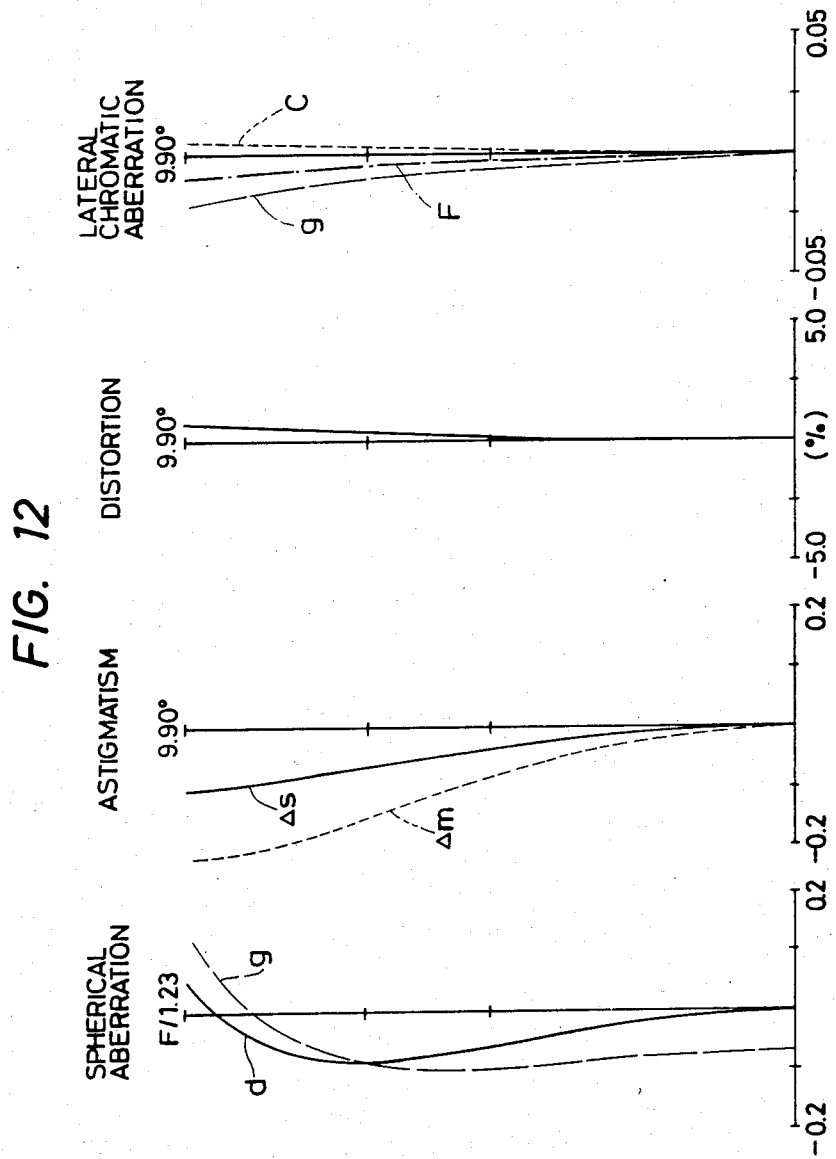
Figure 13:
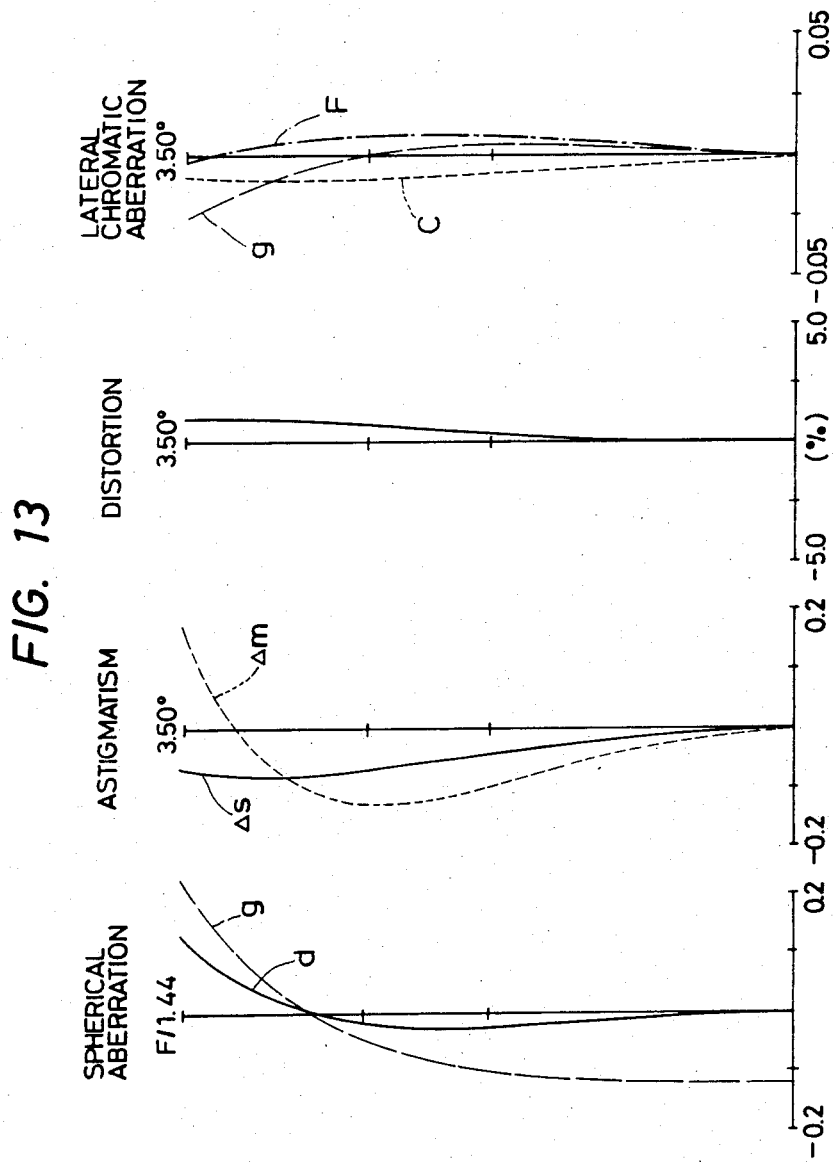

The Embodiment 2 has the composition shown in FIG. 2. The fourth lens group of this lens system comprises a front subsystem IVa consisting of three positive lens components and a negative lens component, and a rear subgroup IVb consisting of a negative lens component and three positive lens components. The third lens group of the Embodiment 2 is designed as a negative cemented doublet comprising a negative lens element and a positive lens element. Aberration characteristics of the Embodiment 2 at the wide, standard and tele positions thereof are illustrated in FIG. 11, FIG. 12 and FIG. 13 respectively.

Figure 3:
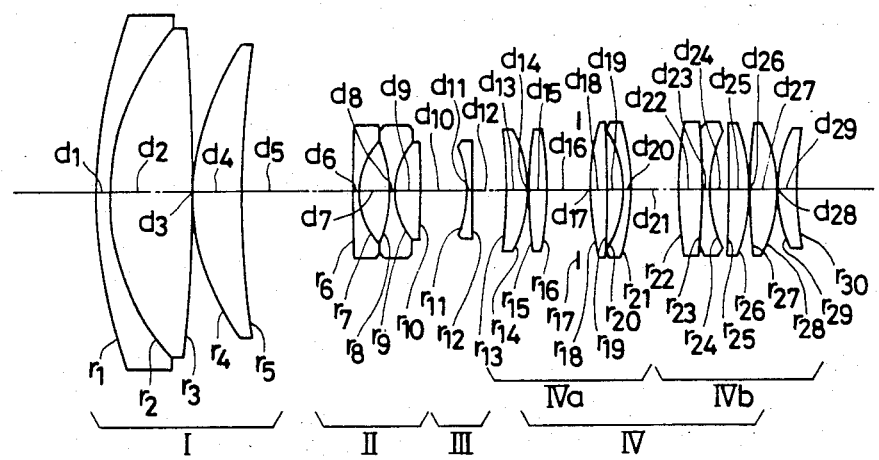
Figure 14:
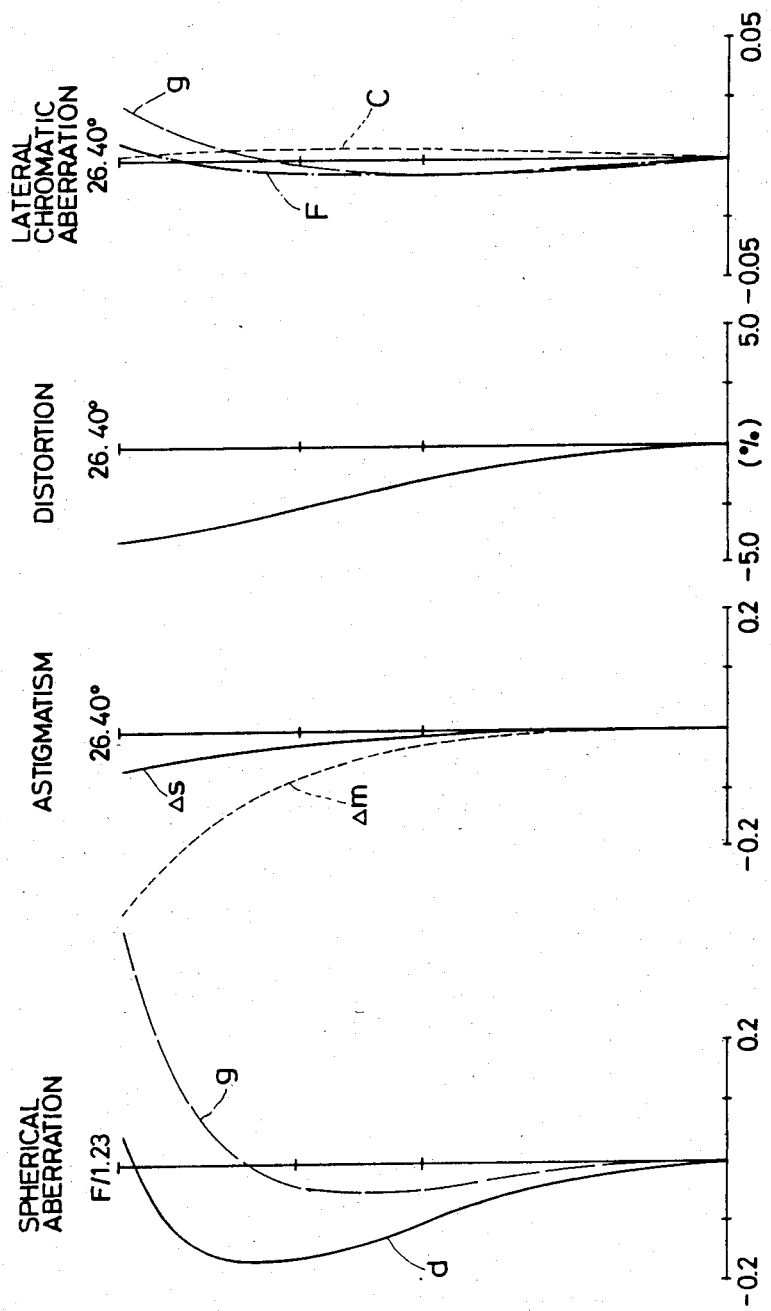
FIG. 14 through FIG. 16 show curves illustrating aberration characteristics of the Embodiment 3.
Figure 15:
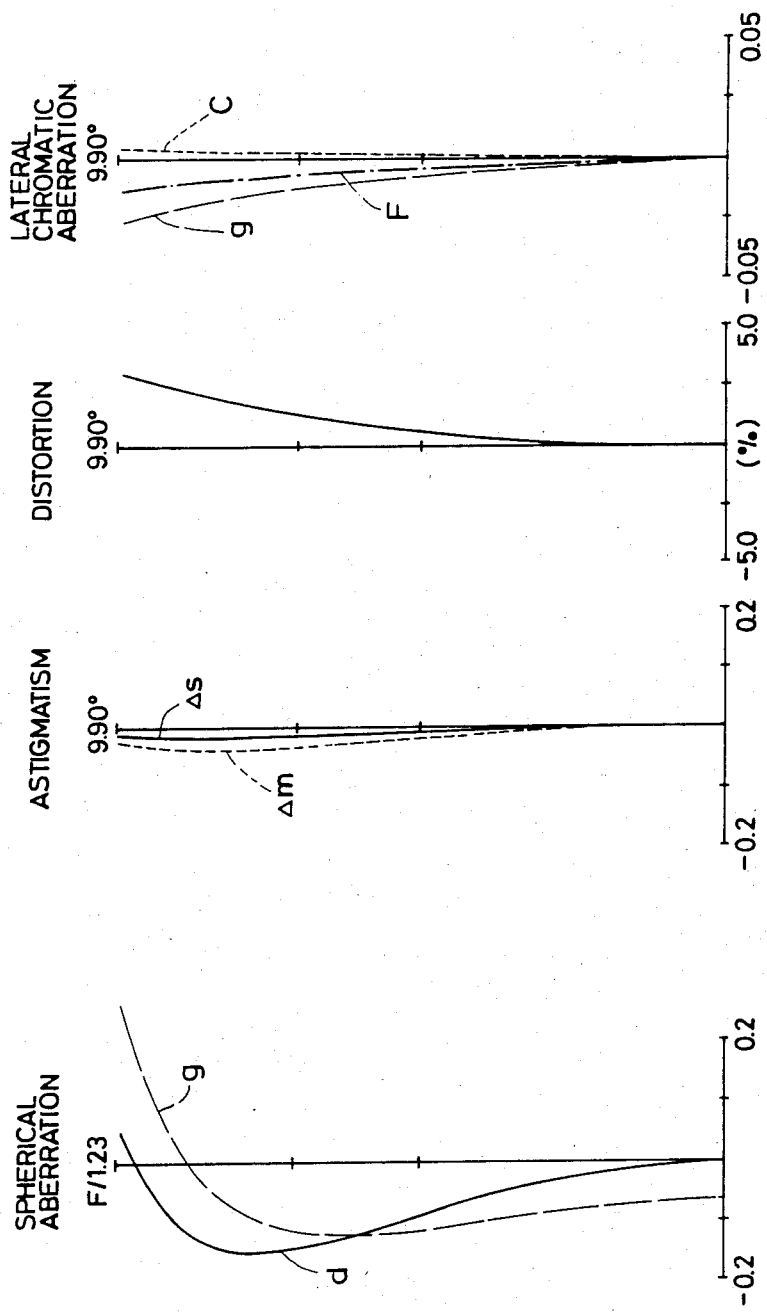
Figure 16:
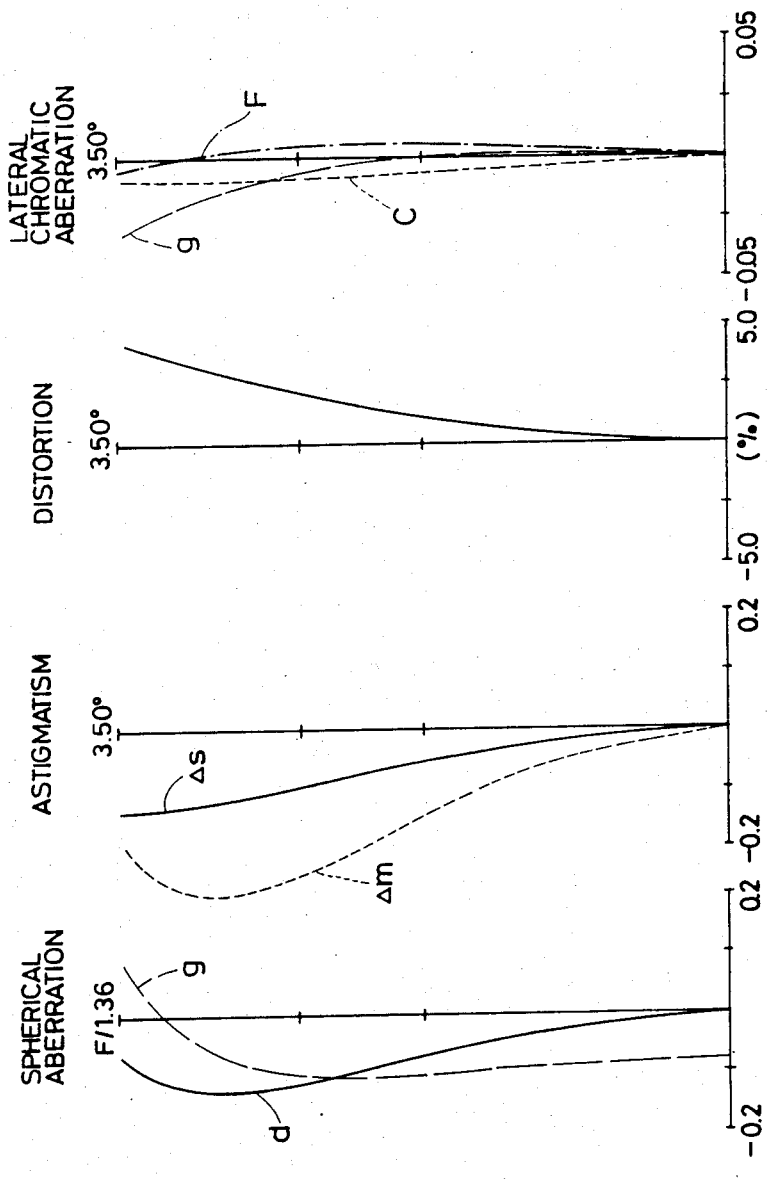

The Embodiment 3 has the composition shown in FIG. 3. The fourth lens group of this Embodiment comprises a front subgroup IVa consisting of three positive lens components and a negative lens component, and a rear sub-group IVb consisting of a negative cemented lens component comprising a positive lens, a negative lens and three positive lens component. Aberration characteristics of this Embodiment at the wide, standard and tele positions thereof are illustrated in FIG. 14, FIG. 15 and FIG. 16 respectively.

Figure 4:
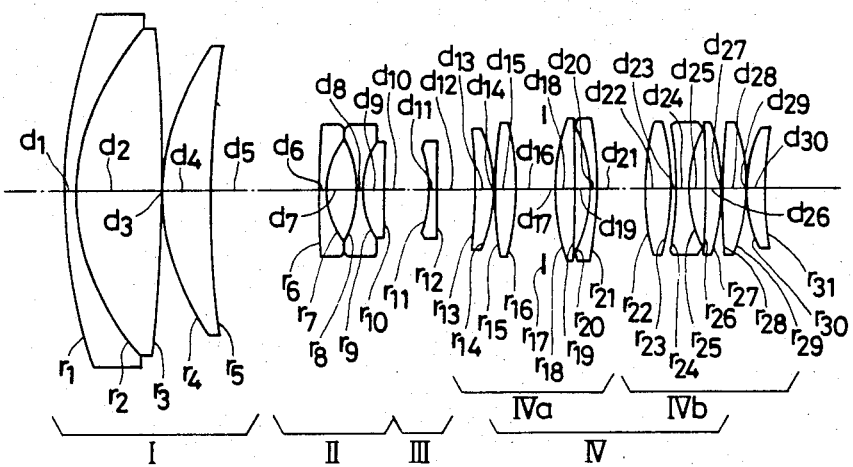
Figure 17:
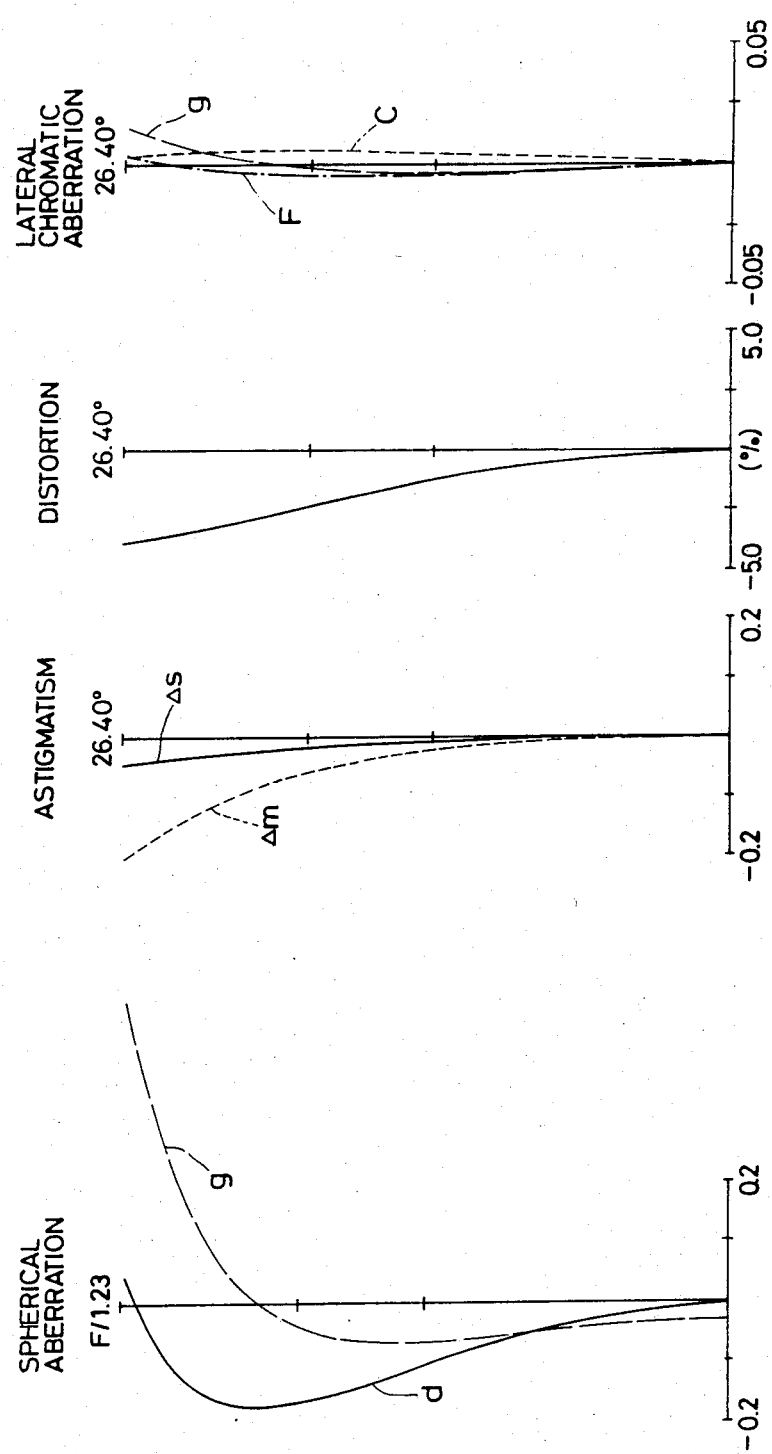
FIG. 17 through FIG. 19 show curves illustrating aberration characteristics of the Embodiment 4.
Figure 18:
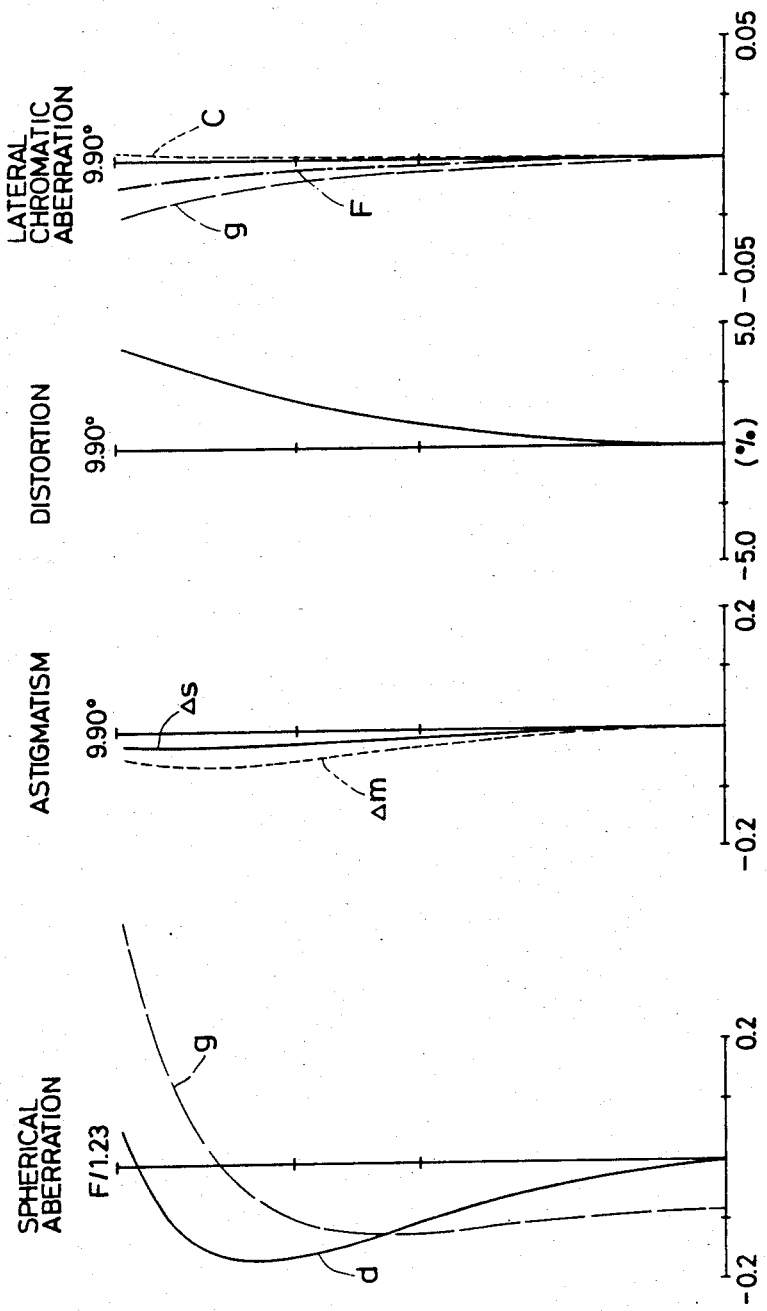
Figure 19:
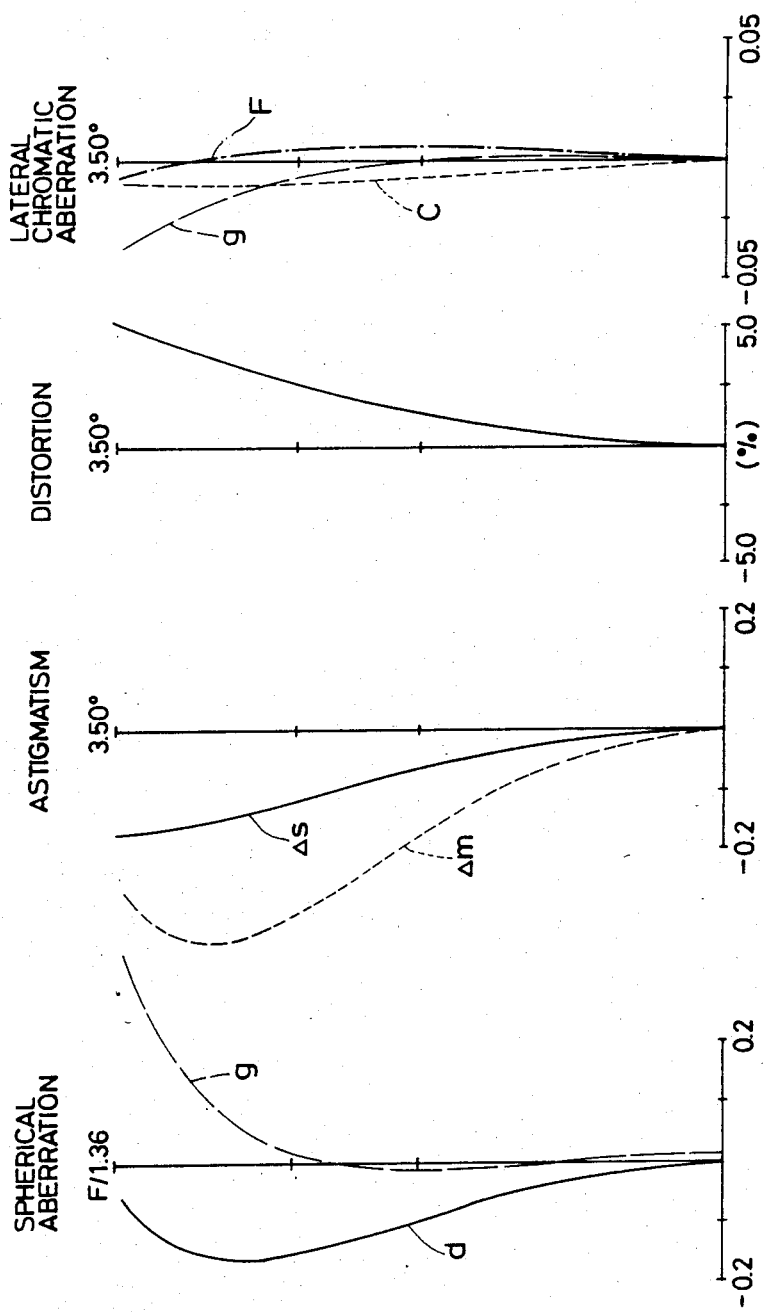

The Embodiment 4 has the composition shown in FIG. 4. The fourth lens group of this Embodiment comprises a front subgroup IVa consisting of three positive lens components and a negative lens component, and a rear subgroup IVb consisting of a positive lens component, a negative lens component (the negative cemented lens component used in the Embodiment 3 separated into two lens components) and three positive lens components. Aberration characteristics of this Embodiment at the wide, standard and tele positions thereof are illustrated in FIG. 17, FIG. 18 and FIG. 19 respectively.

Figure 5:
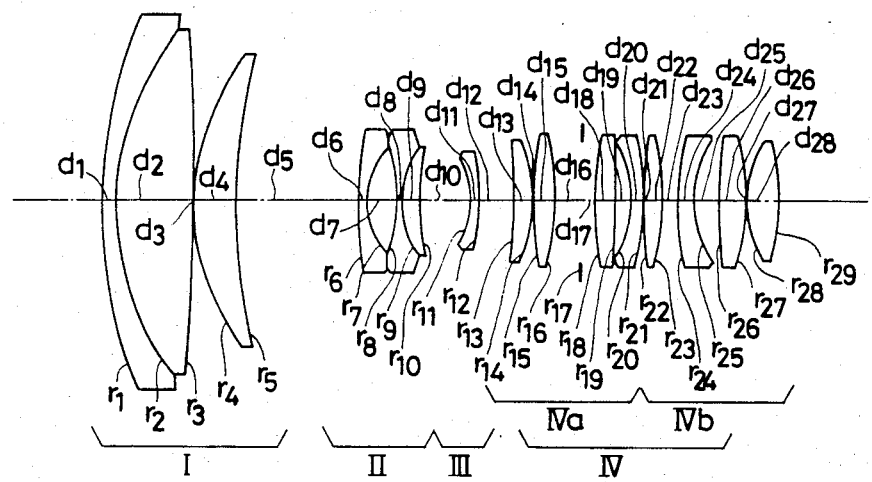
Figure 20:
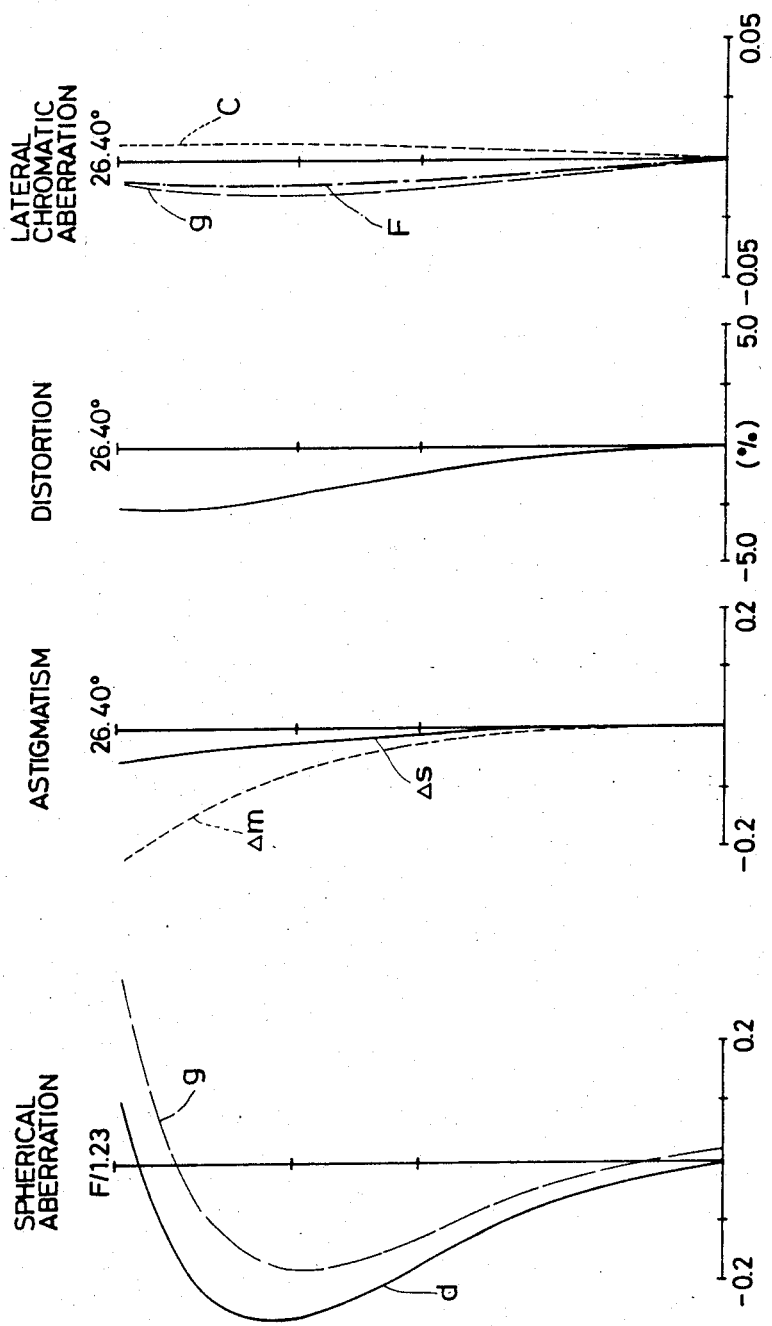
FIG. 20 through FIG. 22 show curves illustrating aberration characteristics of the Embodiment 5.
Figure 21:
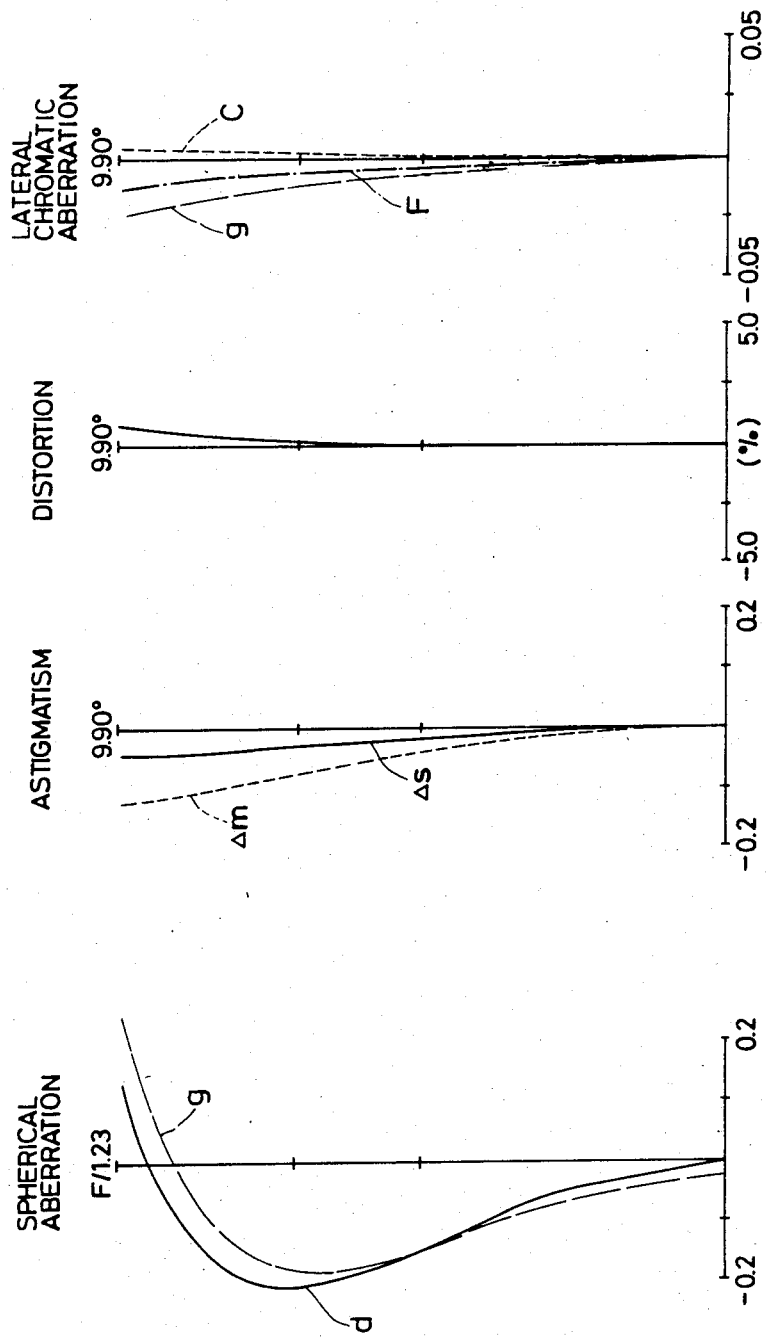
Figure 22:
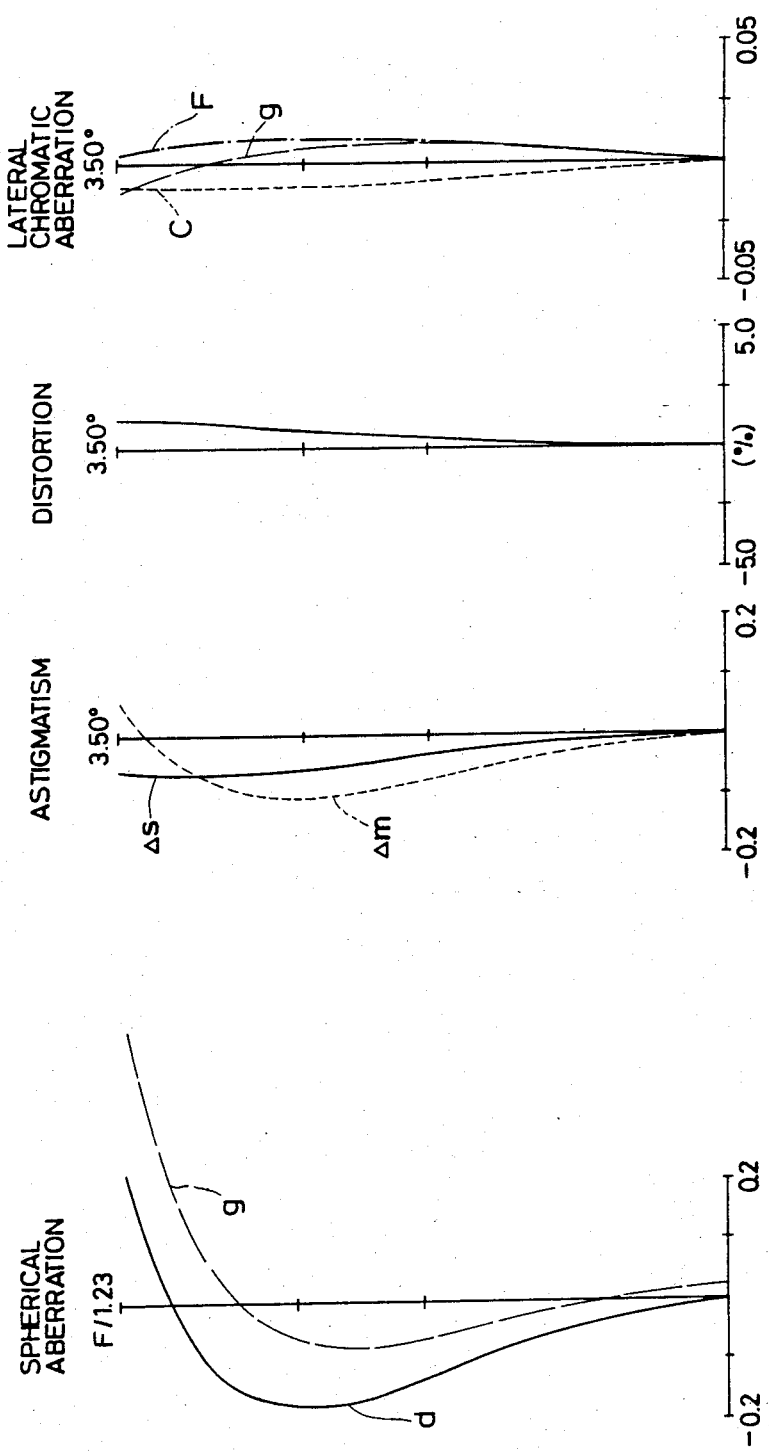

The Embodiment 5 has the composition shown in FIG. 5. The fourth lens group of this Embodiment comprises a front subgroup IVa consisting of three positive lens components and a negative lens component, and a rear subgroup IVb consisting of a positive lens component, a negative lens component and two positive lens components. Aberration characteristics of this Embodiment at the wide, standard and tele positions thereof are illustrated in FIG. 20, FIG. 21 and FIG. 22 respectively.

Figure 6:
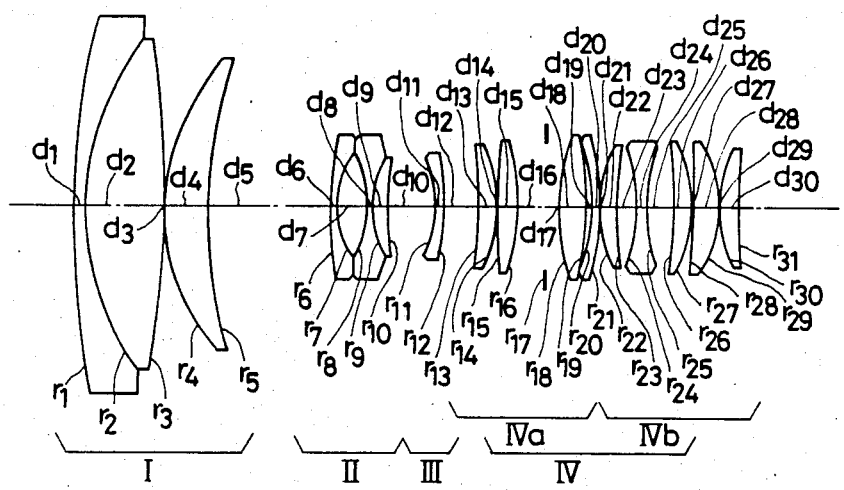
Figure 23:
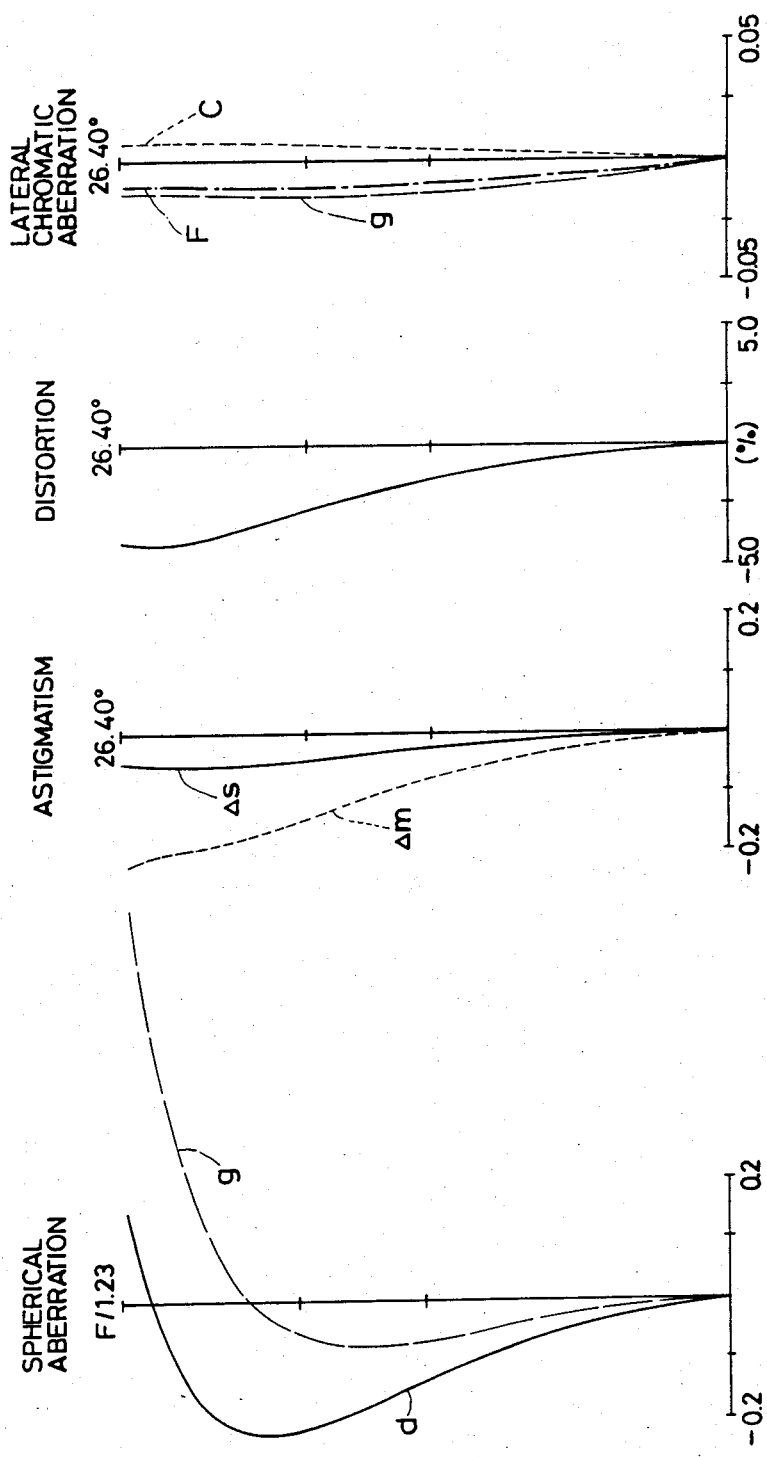
FIG. 23 through FIG. 25 show curves illustrating aberration characteristics of the Embodiment 6.
Figure 24:
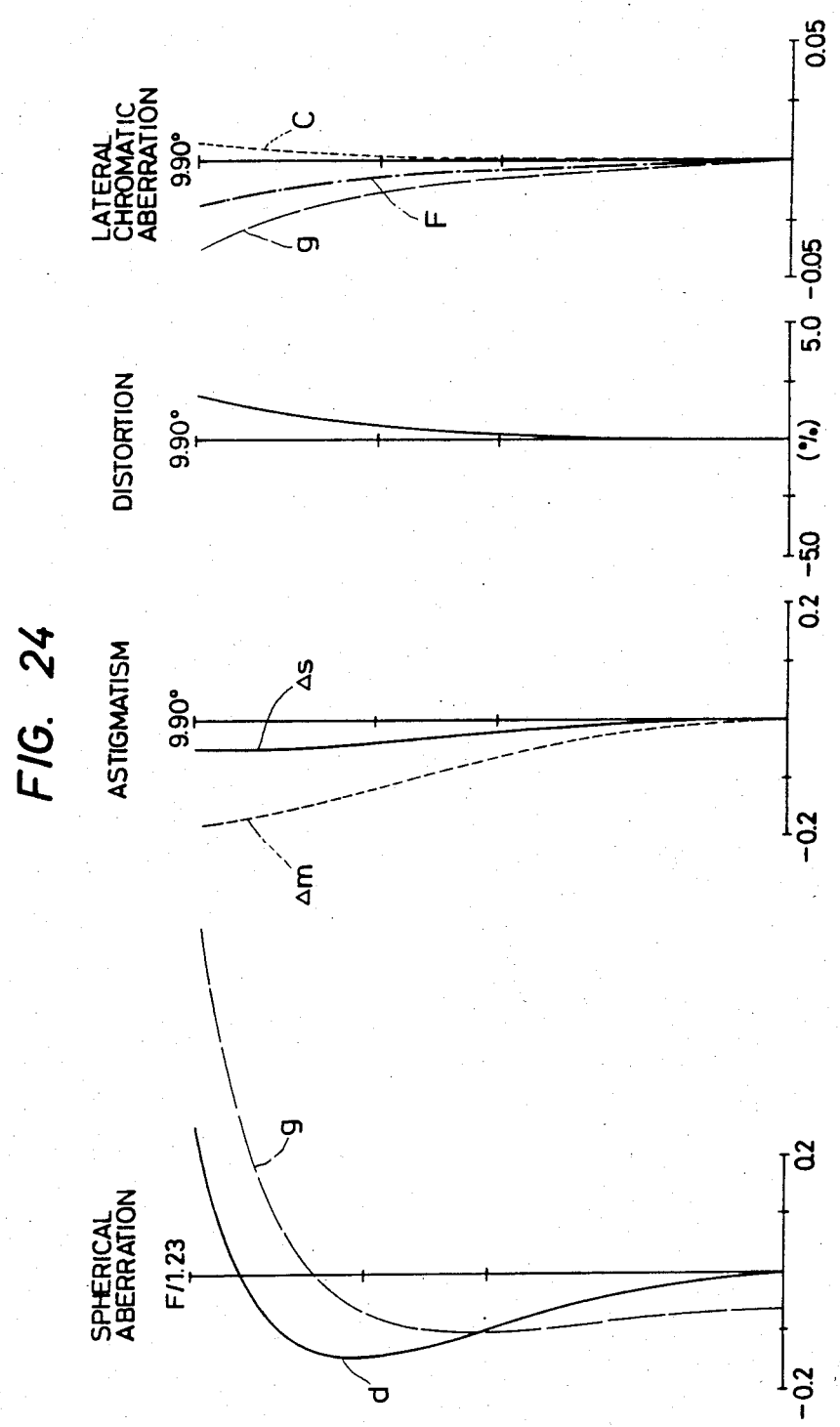
Figure 25:
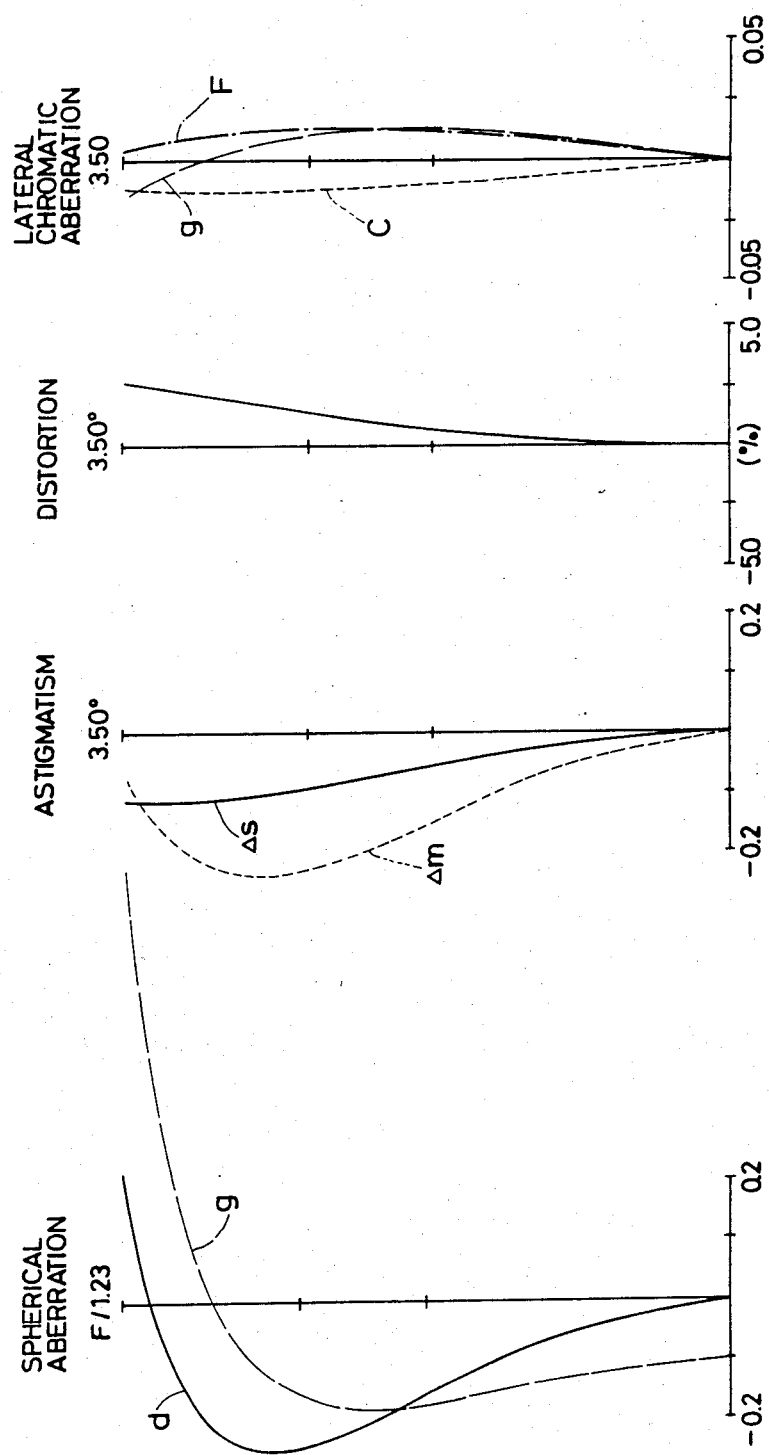

The Embodiment 6 has the composition shown in FIG. 6. The fourth lens group of this Embodiment comprises a front subgroup IVa consisting of three positive lens components and a negative lens component, and a rear subgroup IVb consisting of a positive lens component, a negative lens component and three positive lens components. Aberration characteristics of this Embodiment at the wide, standard and tele positions thereof are illustrated in FIG. 23, FIG. 24 and FIG. 25 respectively.

Figure 7:
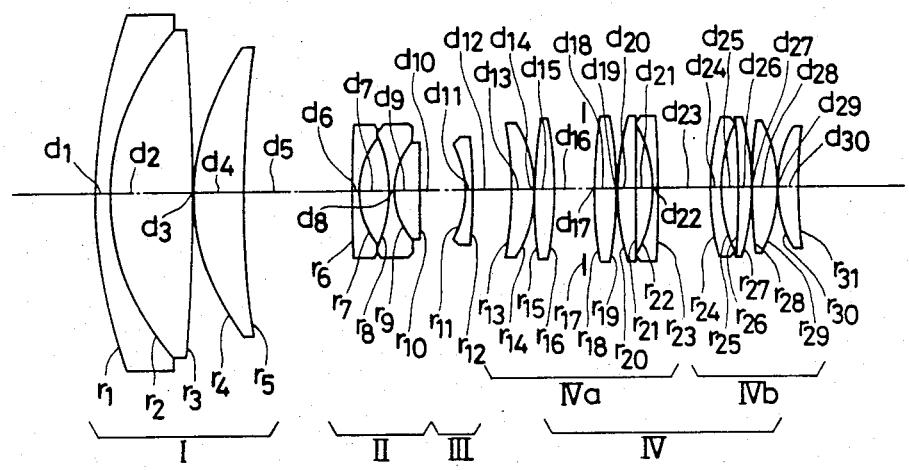
Figure 26:
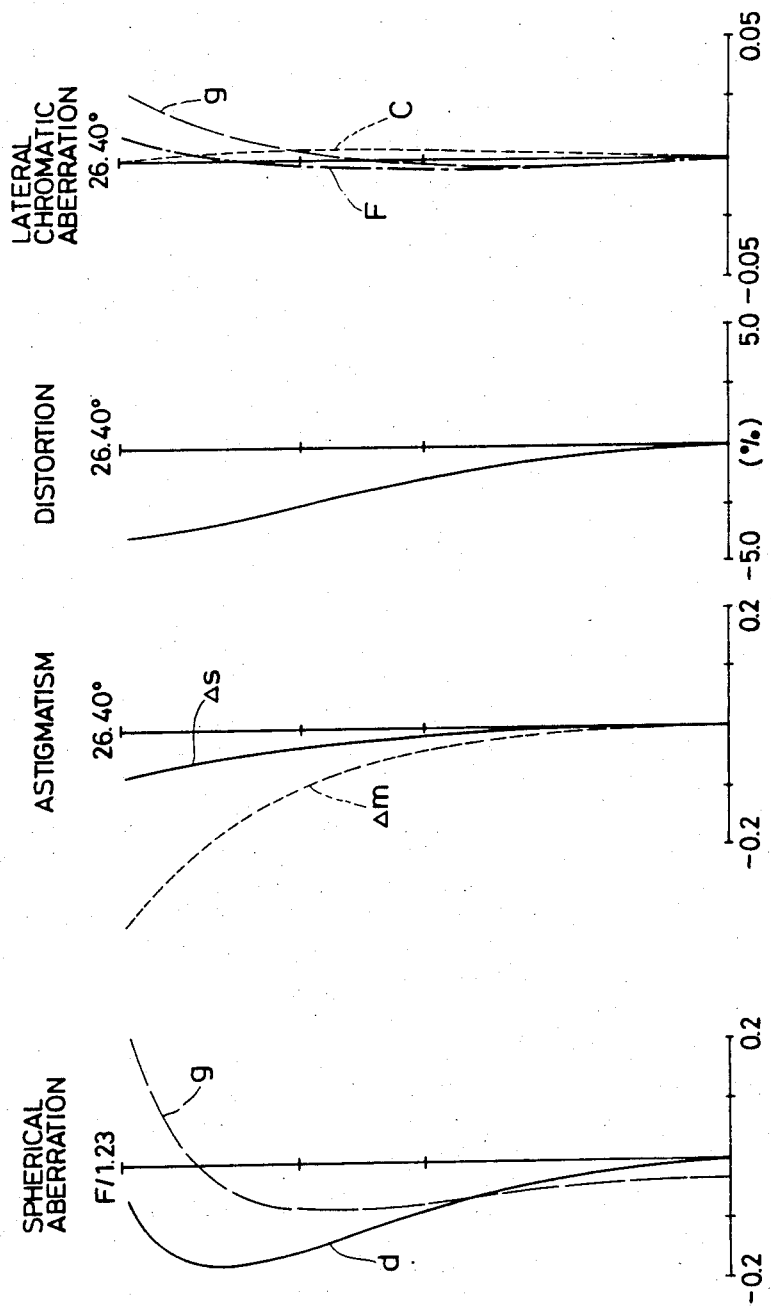
FIG. 26 through FIG. 28 show curves illustrating aberration characteristics of the Embodiment 7.
Figure 27:
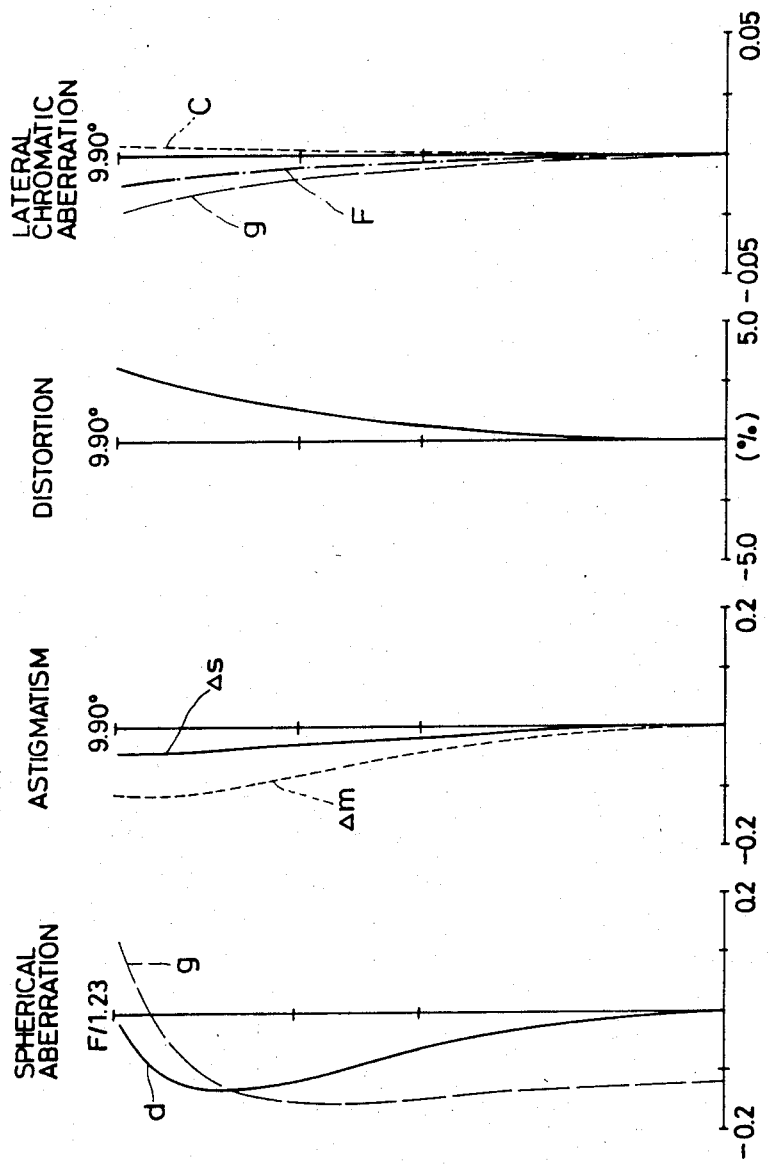
Figure 28:
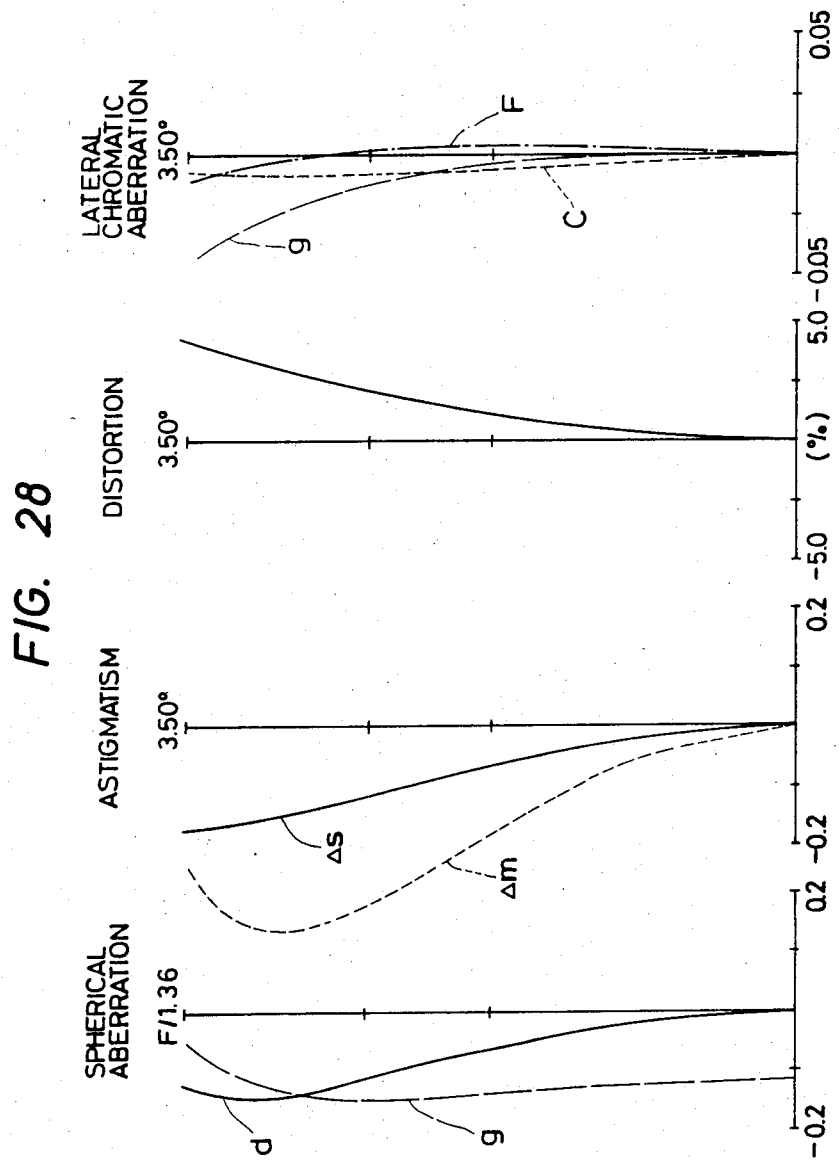

The Embodiment 7 has the composition shown in FIG. 7. The fourth lens group of this Embodiment comprises a front subgroup IVa consisting of four positive lens components and a negative lens component, and a rear subgroup IVb consisting of a negative lens component and three positive lens components. Aberration characteristics of this Embodiment at the wide, standard and tele positions thereof are illustrated in FIG. 26, FIG. 27 and FIG. 28 respectively. As is understood from the foregoing descriptions, the zoom lens system according to the present invention has F number of F/1.2 to F/1.4, a zooming ratio of 8, a very large varifocal ratio, a back focal distance of $0.7 f_S$, high performance even when said zoom lens system is focused on an object located at a short distance, and ratio between total length of said lens system (distance as measured from the first lens surface to the rear focal point) and the focal length of said lens system as a whole, i.e. a telephoto ratio of approximately 2.1, or a compact design relative to the high performance of the zoom lens system.

I claim:

1. A zoom lens system comprising a first lens group having a focusing function and positive power, a second lens group movable along the optical axis for zooming, and having a function to vary focal length of said zoom lens system and negative power, third lens group movable along the optical axis for zooming, and having a function mainly for maintaining image position constant and negative power, and a fourth lens group kept fixed and used as an relay lens, said fourth lens group consisting of a front subgroup comprising, in the order from the object side, at least three positive lens component and at least one negative lens component, and rear subgroup comprising two positive lens components, said zoom lens being so designed as to satisfy the following condition (1):

$$-0.15 < f_W/f_A < 0.5 \qquad (1)$$

wherein the reference symbol $f_W$ represents the shortest focal length of said zoom lens system and the reference symbol $f_A$ designates the total focal length of the system ranging from said first lens group to said front subgroup.

2. A zoom lens system according to claim 1 wherein said first lens group comprises a cemented doublet consisting of a negative meniscus lens element having a convex surface on the object side and a positive lens element, and a positive meniscus lens component, said zoom lens system being so designed as to satisfy the following conditions (2) through (4):

$$5.8 f_W < f_I < 7.8 f_W \qquad (2)$$

$$1.25 f_W < -f_{II} < 1.85 f_W \qquad (3)$$

$$0.58 f_I < r_4 < 0.79 f_I \qquad (4)$$

wherein the reference symbols $f_I$ and $f_{II}$ represent focal lengths of said first and second lens groups respectively, and the reference symbol $r_4$ designates radius of curvature on the object side surface of the positive meniscus lens component arranged in said first lens group.

3. A zoom lens system according to claim 2 satisfying the following additional conditions (5) and (6):

$$1.78 < n_{IVan} \qquad (5)$$

$$\nu_{IVap} < \nu_{IVbp} \qquad (6)$$

wherein the reference symbol $n_{IVan}$ represents refractive index of the negative lens component arranged in the front subgroup of said fourth lens group, the reference symbol $\nu_{IVap}$ designates a mean Abbe's number of the positive lens components arranged in the front subgroup of said fourth lens group and the reference symbol $\nu_{IVbp}$ denote a mean Abbe's number of the positive lens components arranged in the rear subgroup of said fourth lens group.

4. A zoom lens system according to claim 1 wherein said second lens group comprises a negative lens component, and a negative cemented doublet comprising a negative lens element and a positive lens element, and said third lens group comprising a negative lens component, said zoom lens system having the following numerical data:

| $f = 8 \sim 22.63 \sim 64$ | | | |
|---|---|---|---|
| $r_1 = 85.4735$ | | | |
| $d_1 = 1.8700$ | | $n_1 = 1.80518$ | $\nu_1 = 25.43$ |
| $r_2 = 43.6810$ | | | |
| $d_2 = 12.7000$ | | $n_2 = 1.62041$ | $\nu_2 = 60.27$ |
| $r_3 = -277.9006$ | | | |
| $d_3 = 0.1500$ | | | |
| $r_4 = 39.2589$ | | | |
| $d_4 = 7.2200$ | | $n_3 = 1.62041$ | $\nu_3 = 60.27$ |
| $r_5 = 120.0813$ | | | |
| $d_5 = 2.3617 \sim 19.733 \sim 29.339$ | | | |
| $r_6 = 95.3684$ | | | |
| $d_6 = 0.7000$ | | $n_4 = 1.72916$ | $\nu_4 = 54.68$ |
| $r_7 = 14.9068$ | | | |
| $d_7 = 5.5000$ | | | |
| $r_8 = -21.3833$ | | | |
| $d_8 = 0.7000$ | | $n_5 = 1.69680$ | $\nu_5 = 55.52$ |
| $r_9 = 14.2396$ | | | |
| $d_9 = 2.7000$ | | $n_6 = 1.84666$ | $\nu_6 = 23.88$ |
| $r_{10} = 47.8333$ | | | |
| $d_{10} = 29.7663 \sim 8.055 \sim 2.789$ | | | |
| $r_{11} = -16.6399$ | | | |
| $d_{11} = 1.2000$ | | $n_7 = 1.69680$ | $\nu_7 = 55.52$ |
| $r_{12} = -41.6382$ | | | |
| $d_{12} = 1.3468 \sim 5.687 \sim 1.347$ | | | |
| $r_{13} = -335.6182$ | | | |
| $d_{13} = 3.2000$ | | $n_8 = 1.51454$ | $\nu_8 = 54.69$ |

-continued

| $f = 8 \sim 22.63 \sim 64$ | | | |
|---|---|---|---|
| $r_{14} = -23.9469$ | | | |
| $d_{14} = 0.1000$ | | | |
| $r_{15} = 67.8923$ | | | |
| $d_{15} = 3.2000$ | | $n_9 = 1.51454$ | $\nu_9 = 54.69$ |
| $r_{16} = -38.1862$ | | | |
| $d_{16} = 5.0000$ | | | |
| $r_{17} = \infty$ (stop) | | | |
| $d_{17} = 2.0000$ | | | |
| $r_{18} = 33.5096$ | | | |
| $d_{18} = 3.7618$ | | $n_{10} = 1.56873$ | $\nu_{10} = 63.16$ |
| $r_{19} = -204.0980$ | | | |
| $d_{19} = 2.4500$ | | | |
| $r_{20} = -20.1993$ | | | |
| $d_{20} = 1.4443$ | | $n_{11} = 1.80518$ | $\nu_{11} = 25.43$ |
| $r_{21} = -66.5246$ | | | |
| $d_{21} = 3.5000$ | | | |
| $r_{22} = 112.4502$ | | | |
| $d_{22} = 2.0593$ | | $n_{12} = 1.84666$ | $\nu_{12} = 23.88$ |
| $r_{23} = 36.7424$ | | | |
| $d_{23} = 3.8000$ | | | |
| $r_{24} = -165.7742$ | | | |
| $d_{24} = 3.1200$ | | $n_{13} = 1.48749$ | $\nu_{13} = 70.15$ |
| $r_{25} = -26.2172$ | | | |
| $d_{25} = 0.1000$ | | | |
| $r_{26} = 73.7974$ | | | |
| $d_{26} = 4.1400$ | | $n_{14} = 1.48749$ | $\nu_{14} = 70.15$ |
| $r_{27} = -29.3976$ | | | |
| $d_{27} = 0.1500$ | | | |
| $r_{28} = 23.2052$ | | | |
| $d_{28} = 4.0000$ | | $n_{15} = 1.48749$ | $\nu_{15} = 70.15$ |
| $r_{29} = 332.8647$ | | | |
| $f_W/f_A = -0.02317$, $f_1/f_W = 6.964$ | | | |
| $-f_2/f_W = 1.363$, $r_4/f_1 = 0.7047$ | | | |
| $n_{IVan} = 1.80518$, $\nu_{IVap}-\nu_{IVbp} = -12.64$ | | | |
| $f_B = 0.88 f_S$ | | | | wherein the reference symbols $r_1$ through $r_{29}$ represent radii of curvature on the surfaces of the respective lens elements, the reference symbols $d_1$ through $d_{28}$ designate thicknesses of the respective lens elements and airspaces reserved therebetween, the reference symbols $n_1$ through $n_{15}$ denote refractive indices of the respective lens elements, the reference symbols $\nu_1$ through $\nu_{15}$ represent Abbe's numbers of the respective lens elements, the reference symbol $f$ designates focal length of the zoom lens system as a whole and the reference symbol $f_B$ denote back focal distance of the zoom lens system as a whole.

5. A zoom lens system according to claim 1 wherein said second lens group comprises a negative lens component, and a negative cemented doublet consisting of a positive lens element and a negative lens element, and said third lens group comprises a negative cemented doublet consisting of a negative lens element and a positive lens element, said zoom lens system having the following numerical data:

| $f = 8 \sim 22.63 \sim 64$ | | | |
|---|---|---|---|
| $r_1 = 68.1165$ | | | |
| $d_1 = 1.8700$ | | $n_1 = 1.78472$ | $\nu_1 = 25.71$ |
| $r_2 = 38.5219$ | | | |
| $d_2 = 13.5000$ | | $n_2 = 1.62041$ | $\nu_2 = 60.27$ |
| $r_3 = 25151.3683$ | | | |
| $d_3 = 0.1500$ | | | |
| $r_4 = 42.6858$ | | | |
| $d_4 = 7.5000$ | | $n_3 = 1.62041$ | $\nu_3 = 60.27$ |
| $r_5 = 142.3524$ | | | |
| $d_5 = 1.3793 \sim 19.410 \sim 29.351$ | | | |
| $r_6 = 336.5803$ | | | |
| $d_6 = 1.0000$ | | $n_4 = 1.72916$ | $\nu_4 = 54.68$ |
| $r_7 = 16.3280$ | | | |
| $d_7 = 5.5000$ | | | |
| $r_8 = -177.3882$ | | | |

-continued

| $f = 8 \sim 22.63 \sim 64$ | | |
|---|---|---|
| $d_8 = 3.4000$ | $n_5 = 1.80518$ | $\nu_5 = 25.43$ |
| $r_9 = -20.6994$ | | |
| $d_9 = 1.0000$ | $n_6 = 1.72916$ | $\nu_6 = 54.68$ |
| $r_{10} = 32.4097$ | | |
| $d_{10} = 27.2186 \sim 7.158 \sim 3.850$ | | |
| $r_{11} = -15.0752$ | | |
| $d_{11} = 1.0000$ | $n_7 = 1.58913$ | $\nu_7 = 60.97$ |
| $r_{12} = 57.9535$ | | |
| $d_{12} = 2.0000$ | $n_8 = 1.80518$ | $\nu_8 = 25.43$ |
| $r_{13} = -156.4333$ | | |
| $d_{13} = 6.1288 \sim 8.159 \sim 1.526$ | | |
| $r_{14} = -140.9467$ | | |
| $d_{14} = 3.2000$ | $n_9 = 1.51112$ | $\nu_9 = 60.48$ |
| $r_{15} = -23.2467$ | | |
| $d_{15} = 0.1000$ | | |
| $r_{16} = 71.2551$ | | |
| $d_{16} = 3.2000$ | $n_{10} = 1.56873$ | $\nu_{10} = 63.16$ |
| $r_{17} = -54.0741$ | | |
| $d_{17} = 5.0000$ | | |
| $r_{18} = \infty$ (stop) | | |
| $d_{18} = 2.0000$ | | |
| $r_{19} = 37.4988$ | | |
| $d_{19} = 3.7618$ | $n_{11} = 1.48749$ | $\nu_{11} = 70.15$ |
| $r_{20} = -115.2936$ | | |
| $d_{20} = 2.4500$ | | |
| $r_{21} = -22.4039$ | | |
| $d_{21} = 1.4443$ | $n_{12} = 1.84666$ | $\nu_{12} = 23.88$ |
| $r_{22} = -62.0749$ | | |
| $d_{22} = 3.5000$ | | |
| $r_{23} = 154.4449$ | | |
| $d_{23} = 2.0593$ | $n_{13} = 1.80518$ | $\nu_{13} = 25.43$ |
| $r_{24} = 32.4881$ | | |
| $d_{24} = 3.8000$ | | |
| $r_{25} = 479.9838$ | | |
| $d_{25} = 3.1200$ | $n_{14} = 1.48749$ | $\nu_{14} = 70.15$ |
| $r_{26} = -31.9806$ | | |
| $d_{26} = 0.1000$ | | |
| $r_{27} = 45.2918$ | | |
| $d_{27} = 4.6400$ | $n_{15} = 1.48749$ | $\nu_{15} = 70.15$ |
| $r_{28} = -28.3955$ | | |
| $d_{28} = 0.1500$ | | |
| $r_{29} = 21.7612$ | | |
| $d_{29} = 3.5000$ | $n_{16} = 1.48749$ | $\nu_{16} = 70.15$ |
| $r_{30} = 75.8496$ | | |
| $f_W/f_A = 0.01013$, $f_1/f_W = 7.299$ | | |
| $-f_2/f_W = 1.701$, $r_4/f_1 = 0.7310$ | | |
| $n_{IVan} = 1.84666$, $\nu_{IVap}-\nu_{IVbp} = -8.33$ | | |
| $f_B = 0.88 f_S$ | | | wherein the reference symbols $r_1$ through $r_{30}$ represent radii of curvature on the surfaces of the respective lens elements, the reference symbols $d_1$ through $d_{29}$ designate thicknesses of the respective lens elements and airspaces reserved therebetween, the reference symbols $n_1$ through $n_{16}$ denote refractive indices of the respective lens elements, the reference symbols $\nu_1$ through $\nu_{16}$ represent Abbe's numbers of the respective lens elements, the reference symbol f designates focal length of the zoom lens system as a whole and the reference symbol $f_B$ denote back focal distance of the zoom lens system as a whole.

6. A zoom lens system according to claim 1 wherein said second lens group comprises a negative lens component, and a negative cemented doublet consisting of a negative lens element and a positive lens element, and said third lens group comprises a negative lens component, said zoom lens system having the following numerical data:

| $f = 8 \sim 22.63 \sim 64$ | | |
|---|---|---|
| $r_1 = 85.2998$ | | |
| $d_1 = 1.8700$ | $n_1 = 1.78472$ | $\nu_1 = 25.71$ |
| $r_2 = 38.1383$ | | |

-continued

| $f = 8 \sim 22.63 \sim 64$ | | |
|---|---|---|
| $d_2 = 13.8000$ | $n_2 = 1.62299$ | $\nu_2 = 58.14$ |
| $r_3 = -380.4945$ | | |
| $d_3 = 0.1500$ | | |
| $r_4 = 39.2209$ | | |
| $d_4 = 8.2000$ | $n_3 = 1.65830$ | $\nu_3 = 57.33$ |
| $r_5 = 168.6431$ | | |
| $d_5 = 1.0010 \sim 17.792 \sim 26.914$ | | |
| $r_6 = 195.2821$ | | |
| $d_6 = 0.9000$ | $n_4 = 1.77250$ | $\nu_4 = 49.66$ |
| $r_7 = 13.5082$ | | |
| $d_7 = 5.0000$ | | |
| $r_8 = -22.5191$ | | |
| $d_8 = 1.0000$ | $n_5 = 1.72000$ | $\nu_5 = 50.25$ |
| $r_9 = 13.8588$ | | |
| $d_9 = 3.8000$ | $n_6 = 1.80518$ | $\nu_6 = 25.43$ |
| $r_{10} = \infty$ | | |
| $d_{10} = 26.7092 \sim 7.483 \sim 3.214$ | | |
| $r_{11} = -22.1011$ | | |
| $d_{11} = 1.0000$ | $n_7 = 1.69680$ | $\nu_7 = 55.52$ |
| $r_{12} = -505.3584$ | | |
| $d_{12} = 4.1308 \sim 6.565 \sim 1.716$ | | |
| $r_{13} = -83.2775$ | | |
| $d_{13} = 3.1000$ | $n_8 = 1.51742$ | $\nu_8 = 52.41$ |
| $r_{14} = -21.8645$ | | |
| $d_{14} = 0.1500$ | | |
| $r_{15} = 78.1851$ | | |
| $d_{15} = 3.4000$ | $n_9 = 1.51742$ | $\nu_9 = 52.41$ |
| $r_{16} = -45.6704$ | | |
| $d_{16} = 5.0000$ | | |
| $r_{17} = \infty$ (stop) | | |
| $d_{17} = 1.6000$ | | |
| $r_{18} = 36.8992$ | | |
| $d_{18} = 3.4000$ | $n_{10} = 1.56883$ | $\nu_{10} = 56.34$ |
| $r_{19} = -130.9824$ | | |
| $d_{19} = 2.3000$ | | |
| $r_{20} = -23.0307$ | | |
| $d_{20} = 1.2000$ | $n_{11} = 1.80610$ | $\nu_{11} = 40.95$ |
| $r_{21} = -48.7407$ | | |
| $d_{21} = 7.7297$ | | |
| $r_{22} = 40.0123$ | | |
| $d_{22} = 4.2488$ | $n_{12} = 1.62041$ | $\nu_{12} = 60.27$ |
| $r_{23} = -44.8822$ | | |
| $d_{23} = 0.9950$ | | |
| $r_{24} = -59.3863$ | | |
| $d_{24} = 2.0835$ | $n_{13} = 1.80518$ | $\nu_{13} = 25.43$ |
| $r_{25} = 25.8830$ | | |
| $d_{25} = 2.4035$ | | |
| $r_{26} = \infty$ | | |
| $d_{26} = 2.8021$ | $n_{14} = 1.51633$ | $\nu_{14} = 64.15$ |
| $r_{27} = -37.2847$ | | |
| $d_{27} = 0.1513$ | | |
| $r_{28} = 138.5316$ | | |
| $d_{28} = 3.9500$ | $n_{15} = 1.62041$ | $\nu_{15} = 60.27$ |
| $r_{29} = -27.8790$ | | |
| $d_{29} = 0.1543$ | | |
| $r_{30} = 22.8642$ | | |
| $d_{30} = 2.7749$ | $n_{16} = 1.51633$ | $\nu_{16} = 64.15$ |
| $r_{31} = 59.6479$ | | |
| $f_W/f_A = 0.04802$, $f_1/f_W = 6.516$ | | |
| $-f_2/f_W = 1.463$, $r_4/f_1 = 0.7523$ | | |
| $n_{IVan} = 1.80610$, $\nu_{IVap}-\nu_{IVbp} = -8.49$ | | |
| $f_B = 0.88 f_S$ | | | wherein the reference symbols $r_1$ through $r_{31}$ represent radii of curvature on the surfaces of the respective lens elements, the reference symbols $d_1$ through $d_{30}$ designate thicknesses of the respective lens elements and airspaces reserved therebetween, the reference symbols $n_1$ through $n_{16}$ denote refractive indices of the respective lens elements, the reference symbols $\nu_1$ through $\nu_{16}$ represent Abbe's numbers of the respective lens elements, the reference symbol f designates focal length of the zoom lens system as a whole and the reference symbol $f_B$ denote back focal distance of the zoom lens system as a whole.

7. A zoom lens system according to claim 3 wherein said front subgroup of said fourth lens group comprises three positive lens components and a negative lens component, and said rear subgroup comprises a negative lens component and three positive lens components.

8. A zoom lens system according to claim 7 wherein said negative lens component arranged in said rear subgroup is designed as a air-spaced doublet consisting of a positive lens element and a negative lens component.

9. A zoom lens system according to claim 3 wherein said front subgroup of said fourth lens group comprises three positive lens components and a negative lens component, and said rear subgroup comprises a positive lens component, a negative lens component and three positive lens components.

10. A zoom lens system according to claim 9 wherein said second lens group comprises a negative lens component, and a negative cemented doublet consisting of a negative lens element and a positive lens element, and said third lens group comprises a negative lens component, said zoom lens system having the following numerical data:

| $f = 8 \sim 22.63 \sim 64$ | | | |
|---|---|---|---|
| $r_1 = 129.6607$ | | | |
| $d_1 = 1.8700$ | $n_1 = 1.80518$ | $\nu_1 = 25.43$ | |
| $r_2 = 44.1287$ | | | |
| $d_2 = 13.0000$ | $n_2 = 1.65160$ | $\nu_2 = 58.67$ | |
| $r_3 = -149.8822$ | | | |
| $d_3 = 0.1500$ | | | |
| $r_4 = 34.6072$ | | | |
| $d_4 = 7.3000$ | $n_3 = 1.63930$ | $\nu_3 = 44.88$ | |
| $r_5 = 80.9068$ | | | |
| $d_5 = 2.3623 \sim 19.731 \sim 29.340$ | | | |
| $r_6 = 58.3741$ | | | |
| $d_6 = 0.7000$ | $n_4 = 1.72916$ | $\nu_4 = 54.68$ | |
| $r_7 = 14.3017$ | | | |
| $d_7 = 5.5000$ | | | |
| $r_8 = -18.8888$ | | | |
| $d_8 = 0.7000$ | $n_5 = 1.69680$ | $\nu_5 = 55.52$ | |
| $r_9 = 14.9872$ | | | |
| $d_9 = 2.7000$ | $n_6 = 1.84666$ | $\nu_6 = 23.88$ | |
| $r_{10} = 53.0165$ | | | |
| $d_{10} = 29.7660 \sim 8.056 \sim 2.788$ | | | |
| $r_{11} = -18.2358$ | | | |
| $d_{11} = 1.2000$ | $n_7 = 1.69680$ | $\nu_7 = 55.52$ | |
| $r_{12} = -52.8345$ | | | |
| $d_{12} = 1.3466 \sim 5.688 \sim 1.346$ | | | |
| $r_{13} = -74.8377$ | | | |
| $d_{13} = 3.2000$ | $n_8 = 1.54072$ | $\nu_8 = 47.20$ | |
| $r_{14} = -22.4834$ | | | |
| $d_{14} = 0.1000$ | | | |
| $r_{15} = 152.9197$ | | | |
| $d_{15} = 3.2000$ | $n_9 = 1.54072$ | $\nu_9 = 47.20$ | |
| $r_{16} = -39.3445$ | | | |
| $d_{16} = 5.0000$ | | | |
| $r_{17} = \infty$ (stop) | | | |
| $d_{17} = 2.0000$ | | | |
| $r_{18} = 39.6520$ | | | |
| $d_{18} = 4.3000$ | $n_{10} = 1.62230$ | $\nu_{10} = 53.20$ | |
| $r_{19} = -57.7570$ | | | |
| $d_{19} = 1.1500$ | | | |
| $r_{20} = -29.3160$ | | | |
| $d_{20} = 1.0000$ | $n_{11} = 1.80518$ | $\nu_{11} = 25.43$ | |
| $r_{21} = -45.9397$ | | | |
| $d_{21} = 0.1000$ | | | |
| $r_{22} = 24.0615$ | | | |
| $d_{22} = 2.8000$ | $n_{12} = 1.51633$ | $\nu_{12} = 64.15$ | |
| $r_{23} = 77.5326$ | | | |
| $d_{23} = 3.0300$ | | | |
| $r_{24} = -27.9904$ | | | |
| $d_{24} = 1.8100$ | $n_{13} = 1.80518$ | $\nu_{13} = 25.43$ | |
| $r_{25} = 28.3194$ | | | |
| $d_{25} = 4.3000$ | | | |
| $r_{26} = -93.6370$ | | | |
| $d_{26} = 2.8400$ | $n_{14} = 1.51633$ | $\nu_{14} = 64.15$ | |
| $r_{27} = -24.5049$ | | | |
| $d_{27} = 0.1000$ | | | |
| $r_{28} = -2112.8362$ | | | |
| $d_{28} = 4.3000$ | $n_{15} = 1.51633$ | $\nu_{15} = 64.15$ | |

-continued

| $f = 8 \sim 22.63 \sim 64$ | | | |
|---|---|---|---|
| $r_{29} = -19.4015$ | | | |
| $d_{29} = 0.1000$ | | | |
| $r_{30} = 21.4312$ | | | |
| $d_{30} = 3.1000$ | $n_{16} = 1.51633$ | $\nu_{16} = 64.15$ | |
| $r_{31} = 122.3414$ | | | |
| $f_W/f_A = 0.37481$, $f_1/f_W = 6.900$ | | | |
| $-f_2/f_W = 1.363$, $r_4/f_1 = 0.6270$ | | | |
| $n_{IVan} = 1.80518$, $\nu_{IVap} - \nu_{IVbp} = -14.95$ | | | |
| $f_B = 0.88 f_S$ | | | | wherein the reference symbols $r_1$ through $r_{31}$ represent radii of curvature on the surfaces of the respective lens elements, the reference symbols $d_1$ through $d_{30}$ designate thicknesses of the respective lens elements and airspaces reserved therebetween, the reference symbols $n_1$ through $n_{16}$ denote refractive indices of the respective lens elements, the reference symbols $\nu_1$ through $\nu_{16}$ represent Abbe's numbers of the respective lens elements, the reference symbol f designates focal length of the zoom lens system as a whole and the reference symbol $f_B$ denote back focal distance of the zoom lens system as a whole.

11. A zoom lens system according to claim 1 wherein said second lens group comprises a negative lens component, and a negative cemented doublet consisting of a negative lens element and a positive lens element, and said third lens group comprises a negative lens component, said zoom lens system having the following numerical data:

| $f = 8 \sim 22.63 \sim 64$ | | | |
|---|---|---|---|
| $r_1 = 84.5007$ | | | |
| $d_1 = 1.8700$ | $n_1 = 1.78472$ | $\nu_1 = 25.71$ | |
| $r_2 = 38.6265$ | | | |
| $d_2 = 13.8000$ | $n_2 = 1.62299$ | $\nu_2 = 58.14$ | |
| $r_3 = -359.3933$ | | | |
| $d_3 = 0.1500$ | | | |
| $r_4 = 37.8232$ | | | |
| $d_4 = 8.2000$ | $n_3 = 1.62041$ | $\nu_3 = 60.27$ | |
| $r_5 = 153.8556$ | | | |
| $d_5 = 1.0004 \sim 18.066 \sim 27.310$ | | | |
| $r_6 = 297.3091$ | | | |
| $d_6 = 0.9000$ | $n_4 = 1.77250$ | $\nu_4 = 49.66$ | |
| $r_7 = 13.1817$ | | | |
| $d_7 = 5.0000$ | | | |
| $r_8 = -24.5364$ | | | |
| $d_8 = 1.0000$ | $n_5 = 1.72916$ | $\nu_5 = 54.68$ | |
| $r_9 = 12.5119$ | | | |
| $d_9 = 4.1000$ | $n_6 = 1.80518$ | $\nu_6 = 25.43$ | |
| $r_{10} = -382.8361$ | | | |
| $d_{10} = 26.9879 \sim 7.779 \sim 3.319$ | | | |
| $r_{11} = -17.4706$ | | | |
| $d_{11} = 1.0000$ | $n_7 = 1.69680$ | $\nu_7 = 55.52$ | |
| $r_{12} = -83.2942$ | | | |
| $d_{12} = 4.3530 \sim 6.499 \sim 1.716$ | | | |
| $r_{13} = -58.7565$ | | | |
| $d_{13} = 3.5000$ | $n_8 = 1.62230$ | $\nu_8 = 53.20$ | |
| $r_{14} = -23.1305$ | | | |
| $d_{14} = 0.1500$ | | | |
| $r_{15} = 83.8158$ | | | |
| $d_{15} = 3.5000$ | $n_9 = 1.51742$ | $\nu_9 = 52.41$ | |
| $r_{16} = -49.0445$ | | | |
| $d_{16} = 5.0000$ | | | |
| $r_{17} = \infty$ (stop) | | | |
| $d_{17} = 1.4000$ | | | |
| $r_{18} = 82.7336$ | | | |
| $d_{18} = 3.6000$ | $n_{10} = 1.51633$ | $\nu_{10} = 64.15$ | |
| $r_{19} = -63.1310$ | | | |
| $d_{19} = 0.1500$ | | | |
| $r_{20} = 40.0872$ | | | |
| $d_{20} = 3.3989$ | $n_{11} = 1.51633$ | $\nu_{11} = 64.15$ | |
| $r_{21} = -252.9334$ | | | |
| $d_{21} = 2.2493$ | | | |

-continued

| $f = 8 \sim 22.63 \sim 64$ | | | |
|---|---|---|---|
| $r_{22} = -26.3481$ | | | |
| $d_{22} = 1.1206$ | | $n_{12} = 1.84666$ | $\nu_{12} = 23.88$ |
| $r_{23} = -134.8965$ | | | |
| $d_{23} = 8.6193$ | | | |
| $r_{24} = 49.2015$ | | | |
| $d_{24} = 1.6583$ | | $n_{13} = 1.84666$ | $\nu_{13} = 23.88$ |
| $r_{25} = 26.8478$ | | | |
| $d_{25} = 2.5010$ | | | |
| $r_{26} = -322.1967$ | | | |
| $d_{26} = 2.4268$ | | $n_{14} = 1.48749$ | $\nu_{14} = 70.15$ |
| $r_{27} = -42.3196$ | | | |
| $d_{27} = 0.1513$ | | | |
| $r_{28} = 102.1009$ | | | |
| $d_{28} = 4.2325$ | | $n_{15} = 1.51633$ | $\nu_{15} = 64.15$ |
| $r_{29} = -23.0642$ | | | |
| $d_{29} = 0.1543$ | | | |

12. A zoom lens system according to claim 5 wherein said second lens group comprises a negative lens component, and a negative cemented doublet consisting of a negative lens element and a positive lens element, and said third lens group comprises a negative lens component, said zoom lens system having the following numerical data:

| $f = 8 \sim 22.63 \sim 64$ | | | |
|---|---|---|---|
| $r_1 = 83.4999$ | | | |
| $d_1 = 1.8700$ | | $n_1 = 1.78472$ | $\nu_1 = 25.71$ |
| $r_2 = 39.5121$ | | | |
| $d_2 = 13.8000$ | | $n_2 = 1.62299$ | $\nu_2 = 58.14$ |
| $r_3 = -393.4583$ | | | |
| $d_3 = 0.1500$ | | | |
| $r_4 = 38.6529$ | | | |
| $d_4 = 8.2000$ | | $n_3 = 1.62041$ | $\nu_3 = 60.27$ |
| $r_5 = 151.0703$ | | | |
| $d_5 = 1.0304 \sim 18.366 \sim 27.789$ | | | |
| $r_6 = 204.0839$ | | | |
| $d_6 = 0.9000$ | | $n_4 = 1.73400$ | $\nu_4 = 51.49$ |
| $r_7 = 12.9841$ | | | |
| $d_7 = 5.0000$ | | | |
| $r_8 = -22.3059$ | | | |
| $d_8 = 1.0000$ | | $n_5 = 1.72000$ | $\nu_5 = 50.25$ |
| $r_9 = 13.0696$ | | | |
| $d_9 = 4.1000$ | | $n_6 = 1.80518$ | $\nu_6 = 25.43$ |
| $r_{10} = -167.8960$ | | | |
| $d_{10} = 26.7210 \sim 7.724 \sim 3.300$ | | | |
| $r_{11} = -18.6243$ | | | |
| $d_{11} = 1.0000$ | | $n_7 = 1.69680$ | $\nu_7 = 55.52$ |
| $r_{12} = -188.2149$ | | | |
| $d_{12} = 3.8445 \sim 5.504 \sim 0.518$ | | | |
| $r_{13} = -65.9779$ | | | |
| $d_{13} = 3.4952$ | | $n_8 = 1.51112$ | $\nu_8 = 60.48$ |
| $r_{14} = -20.4085$ | | | |
| $d_{14} = 0.1500$ | | | |
| $r_{15} = 79.0399$ | | | |
| $d_{15} = 3.5000$ | | $n_9 = 1.51742$ | $\nu_9 = 52.41$ |
| $r_{16} = -39.7602$ | | | |
| $d_{16} = 5.0000$ | | | |
| $r_{17} = \infty$ (stop) | | | |
| $d_{17} = 1.4000$ | | | |
| $r_{18} = 39.8039$ | | | |
| $d_{18} = 3.4000$ | | $n_{10} = 1.51633$ | $\nu_{10} = 64.15$ |
| $r_{19} = -87.3157$ | | | |
| $d_{19} = 2.2500$ | | | |
| $r_{20} = -21.4971$ | | | |
| $d_{20} = 1.3542$ | | $n_{11} = 1.80518$ | $\nu_{11} = 25.43$ |
| $r_{21} = -43.0238$ | | | |
| $d_{21} = 7.4556$ | | | |
| $r_{22} = 50.3713$ | | | |
| $d_{22} = 4.5196$ | | $n_{12} = 1.78590$ | $\nu_{12} = 44.18$ |
| $r_{23} = -140.0701$ | | | |
| $d_{23} = 1.3104$ | | $n_{13} = 1.78472$ | $\nu_{13} = 25.71$ |
| $r_{24} = 27.3364$ | | | |
| $d_{24} = 2.8253$ | | | |
| $r_{25} = -2773.1584$ | | | |
| $d_{25} = 3.0001$ | | $n_{14} = 1.51633$ | $\nu_{14} = 64.15$ |

-continued

| $f = 8 \sim 22.63 \sim 64$ | | | |
|---|---|---|---|
| $r_{26} = -34.8803$ | | | |
| $d_{26} = 0.1513$ | | | |
| $r_{27} = 92.5212$ | | | |
| $d_{27} = 4.5030$ | | $n_{15} = 1.51633$ | $\nu_{15} = 64.15$ |
| $r_{28} = -26.0676$ | | | |
| $d_{28} = 0.1543$ | | | |
| $r_{29} = 21.9704$ | | | |
| $d_{29} = 2.9769$ | | $n_{16} = 1.51454$ | $\nu_{16} = 54.69$ |
| $r_{30} = 50.7233$ | | | |
| $f_W/f_A = 0.01226$, $f_1/f_W = 6.731$ | | | |
| $-f_2/f_W = 1.608$, $r_4/f_1 = 0.7177$ | | | |
| $n_{IVan} = 1.80518$, $\nu_{IVap}-\nu_{IVbp} = -0.4067$ | | | |
| $f_B = 0.88 f_S$ | | | | wherein the reference symbols $r_1$ through $r_{30}$ represent radii of curvature on the surfaces of the respective lens elements, the reference symbols $d_1$ through $d_{29}$ designate thicknesses of the respective lens elements and airspaces reserved therebetween, the reference symbols $n_1$ through $n_{16}$ denote refractive indices of the respective lens elements, the reference symbols $\nu_1$ through $\nu_{16}$ represent Abbe's numbers of the respective lens elements, the reference symbol f designates focal length of the zoom lens system as a whole and the reference symbol $f_B$ denote back focal distance of the zoom lens system as a whole.

13. A zoom lens system according to claim 10 wherein said second lens group comprises a negative lens component, and a negative cemented doublet consisting of a negative lens element and a positive lens element, and said third lens group comprises a negative lens component, said zoom lens system having the following numerical data:

| $f = 8 \sim 22.63 \sim 64$ | | | |
|---|---|---|---|
| $r_1 = 82.6128$ | | | |
| $d_1 = 1.8700$ | | $n_1 = 1.80518$ | $\nu_1 = 25.43$ |
| $r_2 = 43.6256$ | | | |
| $d_2 = 12.7000$ | | $n_2 = 1.61700$ | $\nu_2 = 62.79$ |
| $r_3 = -330.9077$ | | | |
| $d_3 = 0.1500$ | | | |
| $r_4 = 37.4317$ | | | |
| $d_4 = 7.1000$ | | $n_3 = 1.61700$ | $\nu_3 = 62.79$ |
| $r_5 = 103.1788$ | | | |
| $d_5 = 2.7425 \sim 20.171 \sim 29.717$ | | | |
| $r_6 = 97.9540$ | | | |
| $d_6 = 0.7000$ | | $n_4 = 1.65160$ | $\nu_4 = 58.67$ |
| $r_7 = 12.8674$ | | | |
| $d_7 = 5.5000$ | | | |
| $r_8 = -22.9442$ | | | |
| $d_8 = 0.7000$ | | $n_5 = 1.62041$ | $\nu_5 = 60.27$ |
| $r_9 = 14.4737$ | | | |
| $d_9 = 2.7000$ | | $n_6 = 1.78472$ | $\nu_6 = 25.71$ |
| $r_{10} = 37.1680$ | | | |
| $d_{10} = 30.7735 \sim 9.034 \sim 3.799$ | | | |
| $r_{11} = -14.3232$ | | | |
| $d_{11} = 1.2000$ | | $n_7 = 1.69680$ | $\nu_7 = 55.52$ |
| $r_{12} = -29.5067$ | | | |
| $d_{12} = 1.3562 \sim 5.667 \sim 1.357$ | | | |
| $r_{13} = -91.9797$ | | | |
| $d_{13} = 3.2000$ | | $n_8 = 1.54814$ | $\nu_8 = 45.78$ |
| $r_{14} = -21.7629$ | | | |
| $d_{14} = 0.1000$ | | | |
| $r_{15} = 60.5159$ | | | |
| $d_{15} = 3.2000$ | | $n_9 = 1.54814$ | $\nu_9 = 45.78$ |
| $r_{16} = -49.6982$ | | | |
| $d_{16} = 5.0000$ | | | |
| $r_{17} = \infty$ (stop) | | | |
| $d_{17} = 2.0000$ | | | |
| $r_{18} = 59.0473$ | | | |
| $d_{18} = 3.4000$ | | $n_{10} = 1.51112$ | $\nu_{10} = 60.48$ |
| $r_{19} = -128.2891$ | | | |
| $d_{19} = 2.3000$ | | | |

-continued $f = 8 \sim 22.63 \sim 64$

| | | |
|---|---|---|
| $r_{20} = -20.0949$ | | |
| $d_{20} = 2.0000$ | $n_{11} = 1.80518$ | $\nu_{11} = 25.43$ |
| $r_{21} = -47.3582$ | | |
| $d_{21} = 0.1000$ | | |
| $r_{22} = 64.5174$ | | |
| $d_{22} = 3.0000$ | $n_{12} = 1.51633$ | $\nu_{12} = 64.15$ |
| $r_{23} = -43.1117$ | | |
| $d_{23} = 2.6900$ | | |
| $r_{24} = 49.3303$ | | |
| $d_{24} = 2.3300$ | $n_{13} = 1.80518$ | $\nu_{13} = 25.43$ |
| $r_{25} = 17.6141$ | | |
| $d_{25} = 4.0000$ | | |
| $r_{26} = 79.8356$ | | |
| $d_{26} = 4.7000$ | $n_{14} = 1.48749$ | $\nu_{14} = 70.15$ |
| $r_{27} = -32.9791$ | | |
| $d_{27} = 0.1000$ | | |
| $r_{28} = 21.3622$ | | |
| $d_{28} = 5.1000$ | $n_{15} = 1.48749$ | $\nu_{15} = 70.15$ |
| $r_{29} = -34.3817$ | | |

$f_W/f_A = -0.11727$, $f_1/f_W = 7.032$
$-f_2/f_W = 1.362$, $r_4/f_1 = 0.6654$
$n_{IVan} = 1.80518$, $\nu_{IVap} - \nu_{IVbp} = -19.47$
$f_B = 0.88 f_S$ wherein the reference symbols $r_1$ through $r_{29}$ represent radii of curvature on the surfaces of the respective lens elements, the reference symbols $d_1$ through $d_{28}$ designate thicknesses of the respective lens elements and airspaces reserved therebetween, the reference symbols $n_1$ through $n_{15}$ denote refractive indices of the respective lens elements, the reference symbols $\nu_1$ through $\nu_{15}$ represent Abbe's numbers of the respective lens elements, the reference symbol f designates focal length of the zoom lens system as a whole and the reference symbol $f_B$ denote back focal distance of the zoom lens system as a whole.

14. A zoom lens system according to claim 7 wherein said negative lens component arranged in said rear subgroup is designed as a cemented doublet comprising a positive lens element and a negative lens element.

15. A zoom lens system according to claim 3 wherein said front subgroup of said fourth lens group comprises three positive lens components and a negative lens component, and said rear lens group comprises a positive lens component, a negative lens component and two positive lens components.

16. A zoom lens system according to claim 3 wherein said front subgroup of said fourth lens group comprises four positive lens components and a negative lens component, and said rear subgroup comprises a negative lens component and three positive lens components.

* * * * *